United States Patent [19]

Della-Moretta

[11] 4,438,944

[45] Mar. 27, 1984

[54] TOWING AND CARRYING SYSTEMS

[76] Inventor: Leonard B. Della-Moretta, 1796 Russell Pl., Pomona, Calif. 91767

[21] Appl. No.: 240,199

[22] Filed: Mar. 3, 1981

[51] Int. Cl.³ .............................................. B62D 53/00
[52] U.S. Cl. ........................ 280/460 R; 280/461 R; 280/469
[58] Field of Search .............. 280/408, 456 R, 446 R, 280/461 R, 461 A, 472, 469, 470, 460 R, 460 A

[56] References Cited

U.S. PATENT DOCUMENTS

| | | | |
|---|---|---|---|
| 2,120,422 | 6/1938 | Williams et al. | 280/33.44 |
| 2,393,358 | 1/1946 | Ferguson | 280/33.44 |
| 2,441,630 | 5/1948 | Heitshu | 280/33.4 |
| 2,692,148 | 10/1954 | Bywater | 280/460 |
| 3,105,705 | 10/1963 | Richard | 280/161 |
| 3,425,715 | 2/1969 | Weitz | 280/479 |
| 3,544,132 | 12/1970 | Collins | 280/446 R |
| 3,787,068 | 1/1974 | Miller | 280/446 R |
| 3,790,191 | 2/1974 | Gallatin | 280/408 X |
| 3,955,831 | 5/1976 | Whitchurch | 280/423 |
| 4,019,754 | 4/1977 | Hinckley | 280/446 R X |
| 4,042,255 | 8/1977 | Drewek et al. | 280/456 R X |
| 4,059,283 | 11/1977 | Shelton | 280/461 |
| 4,106,794 | 8/1978 | Sallis | 280/446 R |

OTHER PUBLICATIONS

Article, Jan. 1979, *Trailer/Body Builders*, p. 56.

Primary Examiner—Joseph F. Peters, Jr.
Assistant Examiner—Michael Mar
Attorney, Agent, or Firm—Owen, Wickersham & Erickson

[57] ABSTRACT

A system for connecting a towing, pushing, or hoisting self-propelled vehicle to a non-propelled vehicle utilizes two, three, four or five links connected to each vehicle by respective ball joints. The links converge so that the centers of the non-propelling vehicle's forces and motions can be located at places favorable to the steering, stability, and weight distribution of the two vehicles, usually at or near the center of gravity of the self-propelled vehicle. The locations of steering and carrying centers are determined by point-centers or two- or three-degree-of-freedom linear combinations of line-centers where lines extended from the links intersect in points or lines of intersection. The invention includes apparatus for varying the location of the virtual steering and support centers when the vehicles are at rest or in motion, by changing the separation of the hinge points or ball joints on either vehicle. The invention also includes apparatus for varying the height or lateral location of a trailed vehicle by lengthening the links on the side toward which the trailed vehicle is to be relocated, and conversely.

16 Claims, 23 Drawing Figures

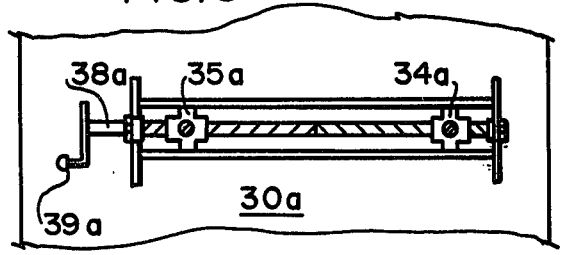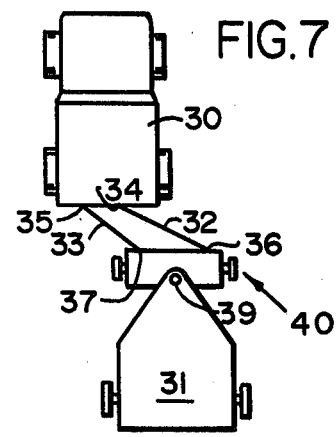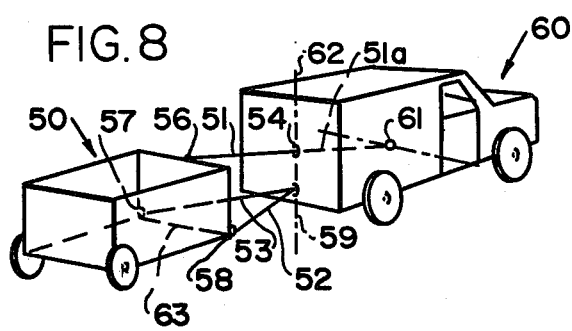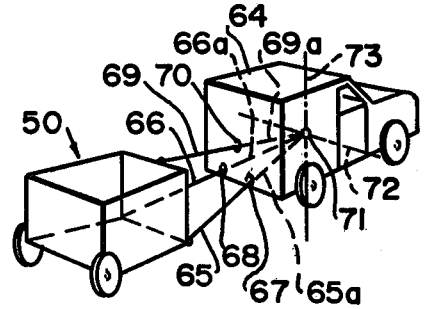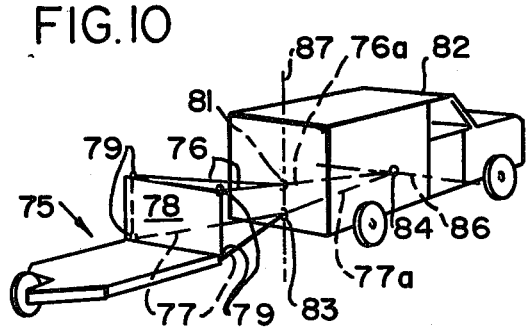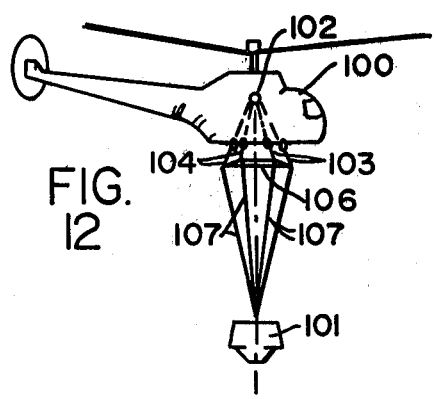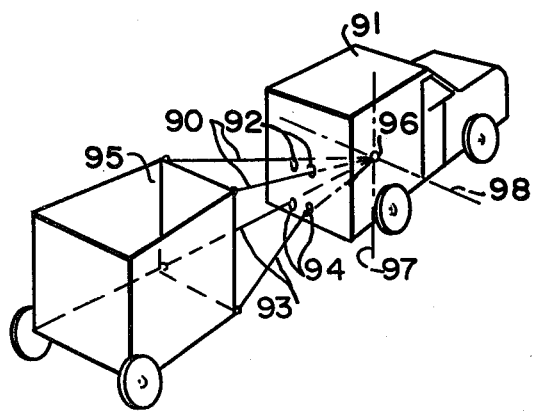

TOWING AND CARRYING SYSTEMS

BACKGROUND OF THE INVENTION

The invention relates to an improved system for connecting a non-propelled body to a propelled body.

In a typical exemplary embodiment, the invention may be used for connecting trailers to tractors or trucks. In other embodiments it may be used, for example, to connect floating barges to towing craft, gliders or geophysical instruments to tow planes, or suspended loads to helicopters. The invention may also be used where the propelled body pushes the non-propelled body, rather than pulls it.

An important feature of the invention is the creation of a remote force-center forward or rearward of the actual points of attachment to the propelled body.

In the invention, two, three, or four non-parallel and generally convergent links join a propelled or towing vehicle to a non-propelled or towed vehicle, and the links are suitably connected by what may be loosely termed "ball joints", "spherical pairs", or "universal connections" to each vehicle. This linkage places the centers of the force vectors leading from the non-propelled vehicle at a remote point in the self-propelled or towing vehicle usually at or near the center of gravity thereof. As a result, improved steering, better stability, enhanced weight distribution, superior traction, and related advantages are obtained. For example, the tendency to jackknife is overcome. Moreover, these advantages can be achieved without incurring costs significantly greater than those of the connecting systems heretofore in use.

Much of the nomenclature and apparatus of the current technology is derived from old forms traceable to horse-drawn sleds, two-wheel carts and four-wheel wagons. Connecting linkages which are presently in use may be categorized by their applications as follows: towing large semi-trailers from a "fifth wheel" pintle and bearing plate; towing small semi-trailers from a ball hitch; towing four-wheel trailers from a ball or pintle hitch connecting with a tongue; towing long loads where ball and pintle hitches are mounted on "stinger" extensions; plow attachment by linkages of several bars operated by hydraulic jacks and cable devices; towed earth-moving road scrapers locked into rigid units for push-loading; single load lines for loads suspended from helicopters; removable floors to enable suspension of helicopter loads from a real point high inside the helicopter; towing gliders and instruments by single line attachment to the towplane; and similar single line attachment for barges connected to tugs. The invention has application in each of these areas as well as in others, through the planned location of a remote center in the propelled or towing body and the use of a variety of combinations of linkage to achieve this remote center. Each of these arrangements will now be briefly discussed with analysis of the current problems in their use.

The "fifth wheel" pintle and bearing plate is employed for connecting large semi-trailers to towing trucks. Mounting is made on the towing rig's frame above and preferably somewhat forward of the center of the rear axle assembly. This arrangement significantly limits the use to which the towing rig may be put, because the large space between the fifth wheel and the rear of the tow rig is no longer available for cargo. Among the disadvantages of this system is a dangerous tendency to "jackknife" when braking under slippery road conditions, because the trailer steering center is at or near the fifth wheel pintle and so is usually aft of the neutral location at the loaded truck's center of gravity. A variety of cable and hydraulic locks and electronic brake-actuating devices are currently being marketed in attempts to relieve the jackknifing problems caused by this unstable towing geometry.

Another problem with fifth wheel towing systems is that on an excessively bumpy road the trailer pintle can oscillate fore and aft due to slack, causing tremendous shock and wear and risking total separation of the trailer from the truck.

Small semi-trailers are usually towed and carried from a ball hitch mounted at the rear of the towing vehicle, thereby preserving passenger and cargo space. Attachment is most commonly made to the frame or directly to the rear axle of the towing vehicle, the ball extending beyond or above its rear bumper. The large rear overhang between the hitch ball and the rear axle results in a disturbance of the weight distribution and stability of the towing vehicle. The trailer weight tends to lift the towing vehicle's front wheels, causing a reduction in steering control. Jackknifing tendencies are increased from this further rearward location of the trailer steering center. Trailer oscillations cause the towing vehicle to yaw and sway, and vice versa. The long rear overhang causes a coupling of the towing vehicle's and the trailer's oscillations, so that when they have nearly equal pendulum periods, a dangerous buildup of oscillations can occur, especially when traveling at higher speeds on a straight road.

Because of this towing overhang, the weight distribution, steering, and stability problems of small semi-trailers connected by a rear-mounted ball hitch are far more severe than those of large semi-trailers connected by a fifth wheel. Consequently, a variety of spring-loaded load-transfer devices have been marketed for restoring weight to the front steering wheels of the towing vehicle and to the rear axle of the trailer by equal and oposite couples applied to both vehicles at the hitch point. Spring and hydraulic frictional damping devices also are available for reducing the swaying of the trailer by restraints on hinge movement that tend to combine the two vehicles more rigidly when traveling on a straight road. These devices, however, do not eliminate the jackknifing and stability problems caused by faulty towing geometry, although their severity is reduced.

Very small one-wheel semi-trailers are usually hinge-hitched to the rear bumper of towing vehicles to provide for up-and-down movements, while restraining the trailing vehicle from turning or twisting. The single trailer-wheel is caster-mounted to permit the wheel to align itself in the direction of travel. The twisting restraints are needed to hold the trailer upright on its single wheel. The turning restraints, however, prevent use in larger, more practical sizes. The long extension from the rear axle to the trailer wheel introduces inertial steering and control moments which, although small because the trailers are small, nevertheless prevent use even in such sizes as a motorcycle trailer. This type of trailer is rare, because its overhung towing geometry prevents its use in larger, practical sizes, and prevents its use with smaller towing vehicles.

Attempts to tow one-wheel and two-wheel semi-trailers by motorcycles have not been practical because of jackknifing force couples during braking and the unstable steering forces which are applied to the rear of the motorcycle through the unfavorable towing geometry.

Full (four-wheel) trailers are commonly towed from a ball or pintle hitch. This connects the rear of the towing vehicle to the tongue of limber of a support-dolly which carries a fifth-wheel mounting from which the rear of the trailer is towed and carried as an ordinary semi-trailer. This "wagon wheel" type steering of the full-trailer requires a long tongue for stability at high towing speeds and a short tongue for tight maneuvering, such as when entering driveways, turning corners, and other maneuvers where only minimal trailer off-tracking is tolerable. These contradictory requirements necessarily result in compromises that are less than satisfactory.

Full-trailers are frequently towed in train behind a semi-trailer, using a short tongue to minimize off-tracking and total train length. A variety of hydraulic, cable, and even permanent locks are being introduced to restrain oscillatory steering movements of these short-tongued wagon-wheel hitches. Such restraint is needed in order to alleviate their dangerous tendency for yawing oscillations. Breakage from high stresses, gross increases of tire wear from side-scrubbing, and loss of ability to enter narrow driveways have been experienced from these attempted solutions which lock the trailer's support-dolly into a rigid or semi-rigid straight-ahead alignment with the towing vehicle to resist the faulty towing geometry.

Ball and pintle hitches are mounted on "stinger" extensions of the frames of logging and pipe-transporting trucks. Similar use is made on parts trains in manufacturing plants. The effect is to reduce or eliminate side-tracking of the trailing vehicle by locating the hitch more nearly midway between the truck and semi-trailer axles. For example, on narrow mountain roads, truck-to-trailer extensions approach a 2:3 ratio, but if high-speed highway travel is involved in the haul, this ratio is considerably reduced. The trailer loads are carried from log and pipe "bunks" mounted on fifth wheel carriers over the truck's rear axle assembly, being distinctly separate from the steering centers at the rear of the stinger extensions. Such specialized arrangements make these trucks unsuitable for carrying other types of cargo.

Pin-jointed plane linkages of several bars, operated by hydraulic jacks and cable devices are in common use for lowering a plow or ripper point, or the cutting edge of an earth scraper or grader blade to its cutting position. Plane "three-point" pin-jointed trapezoidal hitches are common in which the plowing force is exerted from a low point, ahead of the tractor, where the lines of the upper and lower hitch-bars meet at a virtual center. The goal of trying to prevent the plow from overturning the tractor rearwardly by pulling instead from a lower forward point is not completely realized because such plows lack the directional properties needed to hold them at a constant level. Hydraulic cylinders are employed to adjust the diagonal distance across the trapezoid for holding the plow at the constant level. This converts the linkage to a rigid frame which no longer defines the lower draft line that was sought by the designers of these devices.

Earth-moving road scrapers are towed as semi-trailers during hauling, but are locked into rigid units to prevent jackknifing when being loaded with the assistance of a rear-pushing tractor.

A major problem has arisen in the carrying of loads by helicopters. Dangerous instability caused by poorly slung loads has led to sling developments along static, dynamic and aerodynamic principles.

The most dangerous static condition arises when the helicopter attempts to lift a load while not directly vertically over it. The commonly used single lift line fastened to the bottom of the helicopter, or worse, to a rigid subframe below it, pulls sideways on the bottom of the helicopter, tipping the machine away from the load. The harder the machine lifts, the more it tips, until control limits are exceeded, causing an eventual crash if the load is not released in time for the helicopter to recover from its tipped attitude. The tipping is caused by the low mounting point on the helicopter, far below any neutral location high in the machine near its center of gravity.

Another significant problem is dynamic coupling, which arises when the sling's pendulum period is nearly equal to the corresponding pitch-and-roll periods of the helicopter. The low mounting point of the sling, below a neutral location, enhances the load's ability to swing the helicopter and vice versa. Consequently, when the oscillation periods of the helicopter and its slung load are nearly equal, a dangerous buildup of oscillations can occur.

Aerodynamic instability also may occur when a suspended load fishtails to and fro while traveling at higher speeds. Unless the oscillations are reduced, they will induce corresponding oscillations in the helicopter, because of coupling from the low sling-mounted point. Such oscillations are dangerous to stability.

Current practice includes a variety of corrective measures for these sling problems:

a. Special helicopters such as the "Sikorsky Sky Crane" hang the suspended load from a true point, high inside the helicopter. This necessitates major design changes, such as removing the helicopter floor and bottom and relocating its fuel tanks. The method is effective, but drastic. Such redesign is extremely expensive and results in a one-purpose machine that is uneconomical and impractical for carrying passengers and internal cargo.

b. Boeing Vertol developments suspend a single helicopter line coming from a subframe which is attached to the helicopter bottom by four lines. The subframe is narrower than its mounting points to the helicopter; so the directions of the four lines converge to a point beneath the helicopter at the suspended load-lines. When the load-line swings laterally, it pulls the subframe laterally with it in a manner such that the single load-line moves as if it were mounted higher inside the helicopter. The amount of compensating lateral movements depends upon the angularity of the four lines and the vertical location of the coupler point on the swinging subframe where the single load line is attached. Consequently the device must be specially designed for each helicopter on which it is used and cannot function correctly if extra load lines are attached.

c. Dynamic instability is countered by adjusting the sling length to de-tune its pendulum period from that of the helicopter.

d. Aerodynamic oscillations are suppressed by using several attached lines to check the fishtailing. The net effect is to lower the effective mounting point of the sling; therefore, the lines must be skillfully located and slacked to prevent introduction of excessive static intability.

From these developments, existing improved slings can raise the center of oscillation to a more neutral location, or adjust the period by adjusting the load line's length, or reduce aerodynamic oscillation by using extra lines, but cannot do all three of these at once. The user has had to evaluate which of the problems is the most serious, and be content to live with the others.

Attempts to arrange a connecting system in such a manner that a remote steering center is created have been made in the prior art. The problem is, and has been, that they do not really work. A discussion of some of these earlier attempts is nonetheless necessary for a complete understanding of the present invention. Since the invention relates principally to embodiments having two-, three or four-link systems for creating a remote steering axis, the discussion of prior art will be likewise arranged.

Two-Link System

The U.S. patent to Williams (U.S. Pat. No. 2,120,422), shows two tow links which might appear to define a remote forward steering center, but in fact the two converging links are rigidly locked at their connection to a plate secured to the towing vehicle. No attempt is made to provide a remote forward steering or carrying center.

Bywater's U.S. Pat. No. 2,692,148 teaches an axially rigid two-link system using a pair of cross braces to restrain the lateral freedom of an implement without side-drift. This rigidity is directly the inverse of the present invention and does not give any of the beneficial steering and control desired.

The introduction of potential skewness to links having a freedom to twist is a basic problem of Richard's U.S. Pat. No. 3,105,705. Richard uses two angled bars arranged one above the other to carry the weight of the front end of a trailer from a remote forward axis where hypothetical extensions of the upper and lower bars converge. Steering is, however, accomplished from a fixed, real, vertical axis at the point of attachment to the tractor, rather than a remote forward axis. The second possible vertical steering axis at the trailer end of the links is restrained by use of a rigid hinge (equivalent to two bottom bars in a rigid triangle with the front of the trailing vehicle) thus precluding any vertical-axis turning there. Richard's remote carrying center towing arrangement would be operative and beneficial for its limited purpose, but the patent does not recognize some important principles of the present invention described below.

Weitz shows in U.S. Pat. No. 3,425,715 a pair of converging links with rear ball-joint mounting. The links are connected to a hydraulic system to facilitate connecting and disconnecting the links. A three-point hitch is also shown in conjunction with a hydraulic system. In each of these cases the free movement of all points of attachment is so inhibited by the hydraulic system that a freely movable remote centered connection is not possible.

Three-Link System

Ferguson U.S. Pat. No. 2,393,358 shows an early attempt at steering through a remote centered axis in a three-link system. Two horizontal lower links are shown converging from their pin joint attachment at the trailer to their attachment at the rear of the tractor's axle where they are held by a ball-and-pin arrangement. A third link is shown sloping downward from its attachment at a high point on the trailer to its point of attachment at the upper rear section in the middle of the tractor's axle. By extending the lines of the three links forwardly, Ferguson claims to distribute the unbalanced weight of the trailer and create an axis for turning at the theoretical intersection of the extended links at about the center of the rear wheel axle. In fact, the steering axis becomes a slanted one as soon as the trailer moves slightly off the straight, center position. The slanted axis extends through the point of intersection of the lower link lines and the line of the upper bar, and this necessarily results in a rise and fall of the trailer upon turning. The excessive rise and fall is caused primarily by Ferguson's mis-location of the connection point of the upper link on the towing vehicle. This rise and fall increases with sharper turns and with increasing separation of carrying and steering centers, leading to instability, a major disadvantage of the device. Ferguson did not appreciate the principles of the present invention, as will be seen below.

U.S. Pat. No. 2,441,630 to Heitshu also shows the use of three connecting links. In this instance, a top gooseneck extension of the trailer attached to a ball joint at the tractor's rear axle, and two lower links converging toward the trailer to which they are connected by a pin joint, are supplemented by an array of intermediate links for adaption to a particular type of tractor. The steering axis extends through the pin and the ball joint, causing a rise and fall of the trailer during maneuvers. Use of a cross pin to inhibit the rise and fall is taught; however, this merely results in the creation of cantilever loads tending to impart twist to the gooseneck. Despite a certain degree of elasticity and slack in the mechanism, the cantilever loads cannot be overcome by following the teachings of Heitshu with rigid links.

The "Compound Trailer Hitch with Gooseneck Support" of Whitchurch, U.S. Pat. No. 3,955,831, also teaches a three-link hitch; however, there is no remote carrying center shown, as the load is supported by extension of a top link to a real support point over the axle or to a remote forward intersection of two lower links. Applicability is only shown for two-wheel trailers, and a significant loss of passenger or cargo space is inherent in the suggested configurations.

The "three-point" tractor linkage of Shelton, U.S. Pat. No. 4,059,283 provides a remote forward carrying axis, but does not teach a remote turning axis. Three links are shown (the upper being comprised of two links in a rigid triangle with the tractor), angled to intersect at a given point at ground level ahead of the attachment point. The problem is that the only non-horizontal line at which all three lines meet is along the center line of the upper link itself, passing between points D and A in Shelton's drawings; the result is a slanted steering axis with its inherent problems of rise and fall on turning accompanied by twist stresses. These problems are not present in the present invention.

Four-Link Systems

The concept of a four-link system has not enjoyed a significant amount of attention in the past. In FIGS. 8–10 of his drawings, Whitchurch, U.S. Pat. No. 3,955,831, shows a top link for load support with one point of connection at the trailer end which is connected to the elevated transverse member of an inverted U-shaped bar attached to the sides of the towing vehicle. This, again, is a real carrying center as opposed to a remote one, so the only benefit of the U-shaped connection is preservation of some cargo or passenger space as opposed to creation of a remote-centered forward carrying and steering point.

The Shelton patent discussed earlier also includes a four-bar embodiment wherein the top bar is split into two links converging upwardly toward the trailer. The same resulting rise and fall is experienced from this arrangement, with the further detriment that no remote steering center at all, slanted or otherwise, may be achieved, since the steering axis must pass through the top connecting point. In short, the distinct advantages of the present invention could not be obtained.

Finally, in an article in the January 1979 issue of Trailer/Body Builders magazine at page 56 a type of four-link hitch, similar to Shelton's, is shown where the top two links converge upwardly to a single forward point of connection and the bottom two links converge downwardly to a single rear point of connection. The suggested configuration is not capable of achieving any of the beneficial results from a remote steering center. Furthermore, the design is not adaptable to trucks which do not support themselves and is only shown in the double trailer concept.

Five-Link Systems

The applicant knows of no prior art on such systems.

OBJECTS OF THE INVENTION

The invention has many aspects and embodiments, each of which is adressed to eliminating instability, pitch and yaw, rise and fall, and steering problems inherent in present systems of connecting non-propelled to propelled bodies.

One aspect of the invention involves eliminating these problems by the creation of a truly remote steering axis and load-bearing center through proper kinematic arrangement of connecting links.

Another aspect of the invention provides a system for suspending helicopter loads from a remote point high inside the helicopter without costly machine design changes and without creating a one-use machine, yet still retaining unimpaired stability in flight.

Yet another aspect of the invention comprises a connecting system for a train of vehicles so that more than a single trailing vehicle may be towed with the same ease of steering as may a single trailing vehicle, eliminating rise and fall upon turning.

A still further aspect of the invention entails lengthening the links on only one side of a single or multiple train of trailers, so that the trailers may be towed in offset relationship to one side of the towing vehicle without loss of stability or control.

Another aspect of the invention comprises the provision of a vertical or near-vertical alignment of steering axes for prevention of rise and fall when turning.

A further aspect of the invention provides adjustment of link connection positions for high-speed travel free of oscilations and for low-speed travel free of steering difficulties and rise and fall, for cornering and precision placement.

Another aspect involves the statical determinacy of all trailer reactions and link stresses, needing no elastic properties for load transfer or linkage freedom. Here the designer would be free to select a desired steering and carrying axis to best suit the intended use while still retaining the advantages of the invention. Inherent preloading due to statical determinacy removes the slack and shock common to fifth wheel pins on rough roads.

Yet another aspect of the invention comprises a connection system for towed aircraft and geophysical instruments such that their load is placed at a remote point forward in the towing aircraft, thereby improving stability and control.

A further aspect of the invention provides for carrying a heavy load suspended between the rear of one vehicle and the front of another, by two sets of links, on a wheelless carriage between the vehicles.

A still further aspect of the invention involves expandable and contractable links for connecting towing to towed vehicles and for discharging the contents of the trailer by tipping upon operation of the expandable feature of the links. No loss of control is found in towing while still retaining the dumping benefits.

SUMMARY OF THE INVENTION

The invention involves a linkage assembly of two or more non-parallel ball (or similar) jointed links for connecting a propelled body to a non-propelled body. Also involved is a method of defining and varying the locations of instant centers of vertical and horizontal angular motions between the propelled and non-propelled bodies by arranging and varying the spacing of the ball-hinges at the points where they are attached to the bodies and by varying the lengths of the connecting links.

The propelled body could be any form of towing, pushing, or carrying rig, such as a truck, car, motorcycle, tractor, bicycle, crane, plane, helicopter, tug-boat, or even a harnessed animal. The non-propelled body, such as a full trailer, semi-trailer, cart, one-wheel trailer, plow, farm implement, suspended load, towed aircraft geophysical instrument, or barge.

The benefit of the invention is greater stability in motion, steering, and control for the propelled body. There are a variety of physical embodiments which the invention may take, each adapted to a particular function. Each embodiment rests on a common principle and common mathematical justification.

Many alternate embodiments of the invention are possible using two, or more links. For clarity a few of these will later be shown in their simplest configurations, in which the extended link lines meet in simple points to define envisionable pivot centers for steering and carrying.

The general feasibility of the invention rests, however, upon the existence of lines which are intersected by the links when, due to trailer movement or changed ball-joint locations, the simple points of intersection no longer exist. The existence and location of these lines of intersection, the location of steering and carrying axes formed from their linear combination, and the necessary locations of link bars so that the lines of intersection can occur and the links can carry their loads without collapsing or jamming will be demonstrated later when the feasibility of the invention is examined in separate drawings and equations.

The links comprising these assemblies are conceptually kinematic links, capable of maintaining a constant length between their ends while supporting axial tension or compression loads, as needed. They may take many optional forms, such as simple rigid bars or tubes for resisting tension and compression; ropes, chains and cables for resisting tension forces only; simple hydraulic cylinders for compression and adjustment of lengths, two-way hydraulic cylinders for tension and compression only, or if joined by screw threads for both tension and compression.

The ball-joints employed are conceptual ball-joints, capable of holding the links to their points of attachment while permitting up and down, sideways and twisting angular movements of the link in its conceptual ball socket. The joints may take many convenient forms such as loose ring and pintle, or ring and clevis for chain and cable links, with the chain or cable providing the necessary freedom to twist, Cardan joints and other universal joint types for telescoping tubes and hydraulic cylinders providing the necessary freedom to twist, and many other common forms.

The principles of the invention do not require perfect or even precise ball-joint action since small shifting movements of the joints during angular movements of their links merely cause correspondingly small shifts in the height or sideways locations of the towing vehicle without causing internal strain from jamming or otherwise affecting the statically determine stresses on the links. Consequently, rubber end mountings, loose rings and hooks, and similar approximations to the ball joint are intended to be equivalents whenever the term "ball-joint" is used, subject to ordinary engineering considerations of the joint's ability to carry the link's loads and pivot over the necessary range of angles.

Other and further aspects will be apparent to those skilled in the art upon study of the following description of the preferred embodiments. Such aspects are clearly to be within the scope and coverage of the invention.

BRIEF DESCRIPTION OF THE DRAWINGS

FIG. 2 shows the two vehicles in alignment, as when moving straight ahead, while FIGS. 3 and 4 show different positions in turning.

FIG. 6 is a partial elevation view looking forward at a towing truck and showing one form of hitching mechanism permitting angularity adjustment for the links.

FIG. 7 is a diagrammatic plan view showing the use of links of different lengths in a two-link hitch, causing offset towing of the trailer.

FIG. 8 is a somewhat diagrammatic perspective view of a towing vehicle connected by a three-link hitch of the invention to a two-wheel trailer; broken lines illustrate a steering center at the towing vehicle's hitch point and a remote forward carrying center.

FIG. 9 is a somewhat diagrammatic perspective view of a towing vehicle connected by a three-link hitch of the invention to a two-wheel trailer, broken lines again illustrating remote steering and carrying centers.

FIG. 10 is a similar perspective view of a towing vehicle connected by a four-link hitch of the invention to a one-wheel trailer. A vertical turning center is shown at the towing vehicle's hitch point and a horizontal broken line indicates a remote forward carrying center.

FIG. 11 is a similar perspective view of the two-wheel trailer connected by a four-link hitch of the invention to a towing vehicle with broken lines indicating how extensions of the links meet at a remote steering and carrying center.

FIG. 12 is a somewhat diagrammatic view in side elevation of a helicopter with a four-link connection and a frame embodying the principles of the invention, from which a load is suspended. Broken lines lead to the remote carrying center high in the helicopter near its center of gravity.

DESCRIPTION OF THE PREFERRED EMBODIMENTS

Figure 1:
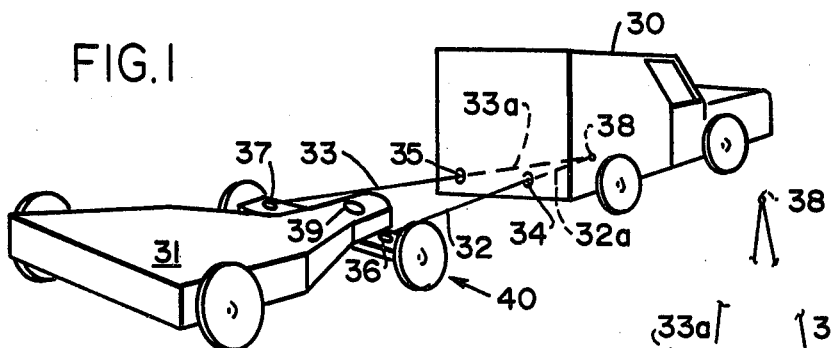
FIG. 1 is a somewhat diagrammatic perspective view of a towing vehicle connected, by a two-link hitch embodying the principles of the invention, to a self-supporting four-wheel trailer. The remote forward steering center is illustrated with the aid of broken lines.

The invention involves a linkage assembly of two, three, or more nonparallel ball (or similar) jointed links for connecting a propelled body to a nonpropelled body. Also involved is a method of defining and varying the locations of instant centers of vertical and horizontal angular motions between the propelled and nonpropelled bodies by arranging and varying the links so as to have the desired effect.

Statical Determinacy of the Invention

Since the invention allows great freedom in details of link joints, materials, configurations and mountings, its practical value is not limited to any particular example of these details, but rests instead upon a well-defined field of new and better solutions it can bring to the geometric problems of hitch design. The ability of the invention to make these solutions feasible and not merely define a new class of unsolved engineering problems, is confirmed by the fact that all new problems in locating remote steering and carrying centers, determining link orientations and stresses, and determining weight distributions on both vehicles, are statically determinate and solvable by ordinary engineering calculation without need for additional inventive efforts to complete the solutions. New and proposed designs can be formed, adjusted, developed and tested by ordinary analytic and experimental methods to satisfy mechanical needs and the requirements of public transportation authorities. For example:

1. Preliminary location of ball-joints can be made by drawing link lines to converge to desired center or pivot axes with both vehicles in their initial positions.

2. For other positions of the trailing vehicle, link positions are determinate and calculable by ordinary vector geometry (see Appendix 1).

3. From the link positions, lines of link intersection are calculable by ordinary vector geometry (See Appendix 2).

4. From these lines of intersection, pivot lines are determinate and calculable by ordinary vector geometry (See Appendix 3).

5. From the pivot lines and trailer loads and weights, ground and other external reactions and hitch reactions for both vehicles are statically determinate and calculable according to well known principles by ordinary vector geometry.

6. From the hitch reactions and link positions, individual link stresses are statically determinate and calculable by ordinary vector geometry (See Appendix 4).

7. From the statical determinacy established in steps 2, 3, 4, 5 and 6, these steps can be replaced by simple experiments such as suspending one plywood sheet from another by inelastic strings or wires attached to the scale ball-joint locations on the model sheets to assure kinematic freedom and solve the same problems by simple model measurements.

These steps 1–7 are merely examples to demonstrate design feasibility. A variety of other methods can be used to accomplish the same ends.

The statical determinacy of link forces for four link systems requires that all the links not be coplanar or parallel. It follows that forces on the four links are statically determinate whenever the external forces on the trailer are determinate and the links are non-parallel.

Similar non-parallel conditions suffer for three and two link systems.

Some Preferred Embodiments of the Invention

Two-link Forms of the Invention (FIGS. 1–7)

In FIG. 1, the invention is illustrated in its simplest form, in which there are only two links. A towing vehicle, here a truck 30, is attached to a trailing vehicle, which in this case is a four-wheel trailer 31, by two lines 32 and 33. The links 32, 33 are each secured, by a ball-joint 34, 35 respectively to the truck 30 and by a ball-joint 36, 37, respectively, to the trailer 31. Other suitable connecting means with comparable freedom of movement may be used in place of precise ball-joints, as discussed previously. The links 32 and 33 are not parallel to each other, and are closer to each other at their truck ends than they are at the trailer ends; in fact, the links 32 and 33 converge in a manner such that imaginary extended lines 32a and 33a of the links 32 and 33 (shown as dotted lines) intersect at a remote point 38 in the towing vehicle 30 forward of the ball-joints 34 and 35. This remote point 38 may be shifted forward or backward by varying the distances between the links 32 and 33 at either pair of ball-joints. The remote point 38 acts as a steering center. This type of arrangement is useful for self-supporting trailers, such as the trailer 31 in FIG. 1 which is held level by a fifth wheel mounting 39 on a front wheel truck 40.

Figure 2:
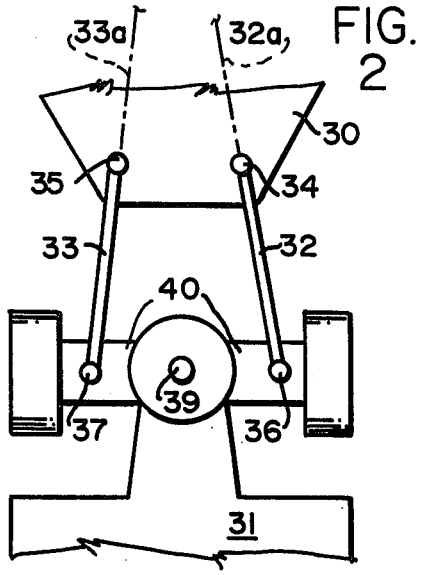
FIGS. 2, 3 and 4 are schematic representations in plan showing various positions of the two links connecting the towing vehicle and trailer in FIG. 1.
Figure 4:
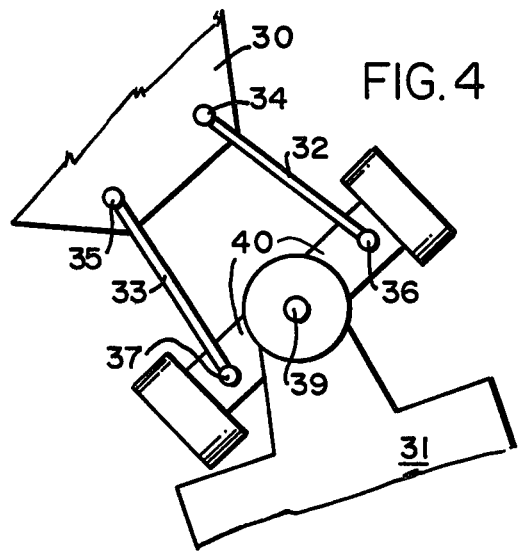
Figure 3:
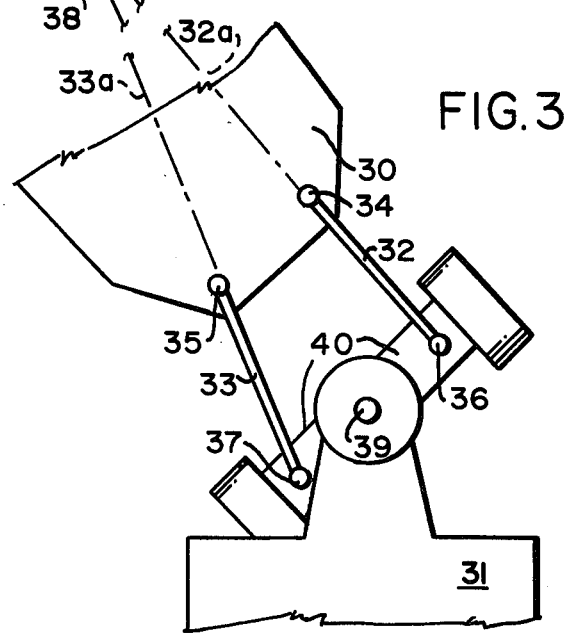

FIGS. 2 through 4 illustrate several configurations of the two-link form of the invention as it appears in different positions of towing, both straight and at different turning angles. In FIG. 2, the truck 30 pulls the trailer 31 straight ahead, with the two non-parallel links 32 and 33 converging in the forward direction, toward the remote intersection point 38 shown in FIG. 1. The truck-and-trailer assembly is highly stable in this position, and any side forces which might tend to move the fifth-wheel mounting 39 and the front wheel truck 40 of the trailer to one side or the other tend to act on the towing truck 30 at the steering center 38 (FIG. 1), which preferably is at or near a vertical line on which the truck's center of gravity lies. Thus, such forces do not tend to pull the rear end of the truck, but rather act at its center of gravity, where they can be stably resisted.

In FIG. 3 the truck 30 has begun a turn, a left turn being illustrated. In the initial stages of a turn, the truck's position rotates in the usual manner, about a point near the truck's rear wheels, and there is rotation of the truck with respect to the trailer 31 and the fifth wheel mounting 39. Rotation of the truck with respect to the fifth wheel mounting causes the links 32 and 33 to rotate with respect to the wheel truck 40 of the trailer, generally as illustrated. The configuration shown in FIG. 3 represents a fairly sharp turn, which would be made at slow speed, but it is illustrative of the variation in position of the truck 30, links 32 and 33, and wheel truck 40, as a turn is made. The link 32 at the outside of the turn is pulled forward with respect to the fifth wheel mounting 39, while the inside link 33 is moved back with respect thereto. This rotates the wheel truck 40 on the mounting 39 as the truck goes into the turn. The hitch links 32 and 33, which provide for remote forward turning centers, produce long-trailer characteristics, so that the trailer follows the direction of turning of the truck more slowly than is the case with a conventional single-member tongue connection.

In FIG. 4 the truck 30 has straightened its front wheels (not shown) and pulls the trailer's front wheel truck in generally the straight, forward direction. The body of the trailer 31 is still partially rotated with respect to the fifth wheel mounting 39, but will straighten out shortly as the truck 30 progresses forward.

As these diagrammatic position drawings of FIGS. 2–4 indicate, the link orientations change constantly during a turn, and thus constantly move the position of the remote steering center 38. The steering center remains at a forward position but shifts to the right on a left turn and to the left on a right turn. It in fact remains close to a line which a projection of a conventional four-wheel trailer tongue would make, if connected to the truck at a point midway between the link connection joints 34 and 35 shown in the drawings.

Figure 5:
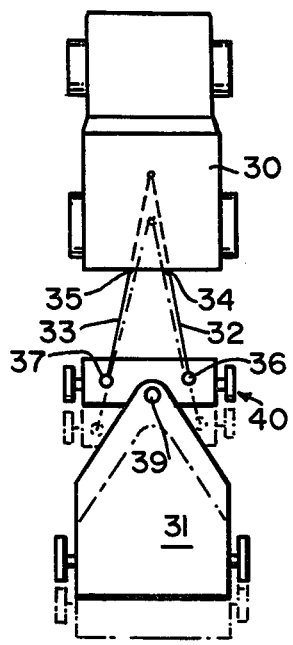
FIG. 5 is a diagrammatic plan view illustrating the use of links of different lengths or different angularities on a two-link hitch of the invention.

As shown in FIG. 5, the length of the links 32 and 33 may be adjusted, as by inner telescoping links having suitable securing means. In order to provide for long-distance high-speed hauling, the links 32 and 33 may be lengthened to achieve long trailer behavior, as by hydraulic telescoping arrangements (not shown), shifting forward the remote forward steering center 38. Alternatively the links may be shortened to obtain more precise maneuverability with a rearwardly shifted remote steering center. Similar effects may be achieved by varying the distance between the points of attachment 34 and 35 to the truck 30 or the points of attachment to the trailer 31.

When the front ball-joints 34 and 35 are mounted at different heights on the towing vehicle 30, or change heights on a twisting road, the dotted extension lines 32a and 33a will become skewed, and the trailer dolly 31 will then have a steering center along a vertical axis that intersects the dotted extension lines 32a and 33a of the links.

The intersection of the extended links lines 32a and 33a can be moved rearwardly to shorten the effective length of the hitch by closing the distance between the front ball hitch mountings 34 and 35. Alternatively, widening the front joint separation or narrowing the rear separation will have the effect of moving the remote steering center 30 forward. Such adjustment can be made by apparatus such as shown, for example, in FIG. 6. A manual crank 39a rotates a rod 38a with opposite-hand threads engaging slidable joint mountings 34a and 35a at the rear 30a of a towing vehicle. Remote adjustability of the joint mountings can be provided if desired.

Lengthening either one—but not both—of the links 32 or 33 will cause the trailer 31 to be towed in offset fashion. The longer link will move the trailer wheel truck 40 toward the side of the truck that link is on, and once equilibrium is reached, the wheel truck 40 will be parallel to the rear axle of the towing vehicle but the trailer will be offset. This is shown in FIG. 7 where the trailing vehicle 31 is offset to the right of the towing vehicle 30, via lengthening of the right link 32. Offset towing to the outside of a turn can help very long trailers clear a curb corner, and offset towing can enable the towing vehicle to work from the hard level road while towing mowers or steel wheeled trailers, etc. It permits trailed implement operation on soft or sloped surfaces when the heavy towing vehicle, such as a grader, would be unstable or cause ruts or other damage to the crops or turf. Such adjustment can be provided by hydraulics (not shown).

Three-link Systems (FIGS. 8 and 9)

FIG. 8 shows an embodiment of a three-link hitch of the invention. The three-link hitch is applicable to non-self-balancing trailers such as the two-wheel trailer 50 illustrated. At least one of the three links 51, 52 and 53 must act upwardly, in compression, to support the load of the trailer's front end. Thus, the upper compression link 51 may support the load, while the lower tension links 52 and 53 resist the tendency of the compression link 51 to separate the two vehicles. Lower rear joints 57 and 58 could be simple hinge joints (on a common horizontal axis) because bottom links 52 and 53 are joined at 59 to from a rigid triangle of which hinge line 63 is the base. Since this rigid triangle is free to twist at ball-joint 59, both upper link joints 54 and 56 must be ball joints to allow sideways freedom to link 51, as during twisting or relative tilt of the two vehicles on a rough road. The trailer turns about a fixed vertical axis 62 through joints 54 and 59 and can pivot vertically about any horizontal axis through a point 61 where the horizontal plane defined by lower links 52 and 53 is intersected by the extended line 51a of link 51. The point 61 of intersection acts as a remote carrying center for the load of the trailer 50, providing a horizontal pivot axis of load support just as if a rigid trailer tongue extended to a sole support on the truck at the point 61. The links could theoretically be lengthened to extend to the pivot axis through point 61 since, axiomatically, it is immaterial where a force is applied along its line of action.

The steering axis for this hitch arrangement is, of course, separate from the remote load center 61, being located along the vertical line 62 passing through both of the front link joints 54 and 59, and thus intersecting all three links 51, 52 and 53. The embodiment would be equally effective if the two links 52 and 53 were located on top and the single link 51 on the bottom. The rigid triangle formed by the two lower links 52 and 53 with the trailer front edge 63 defines the plane in which all pivoting axis for vertical oscillations are located; i.e., at the point in the plane where it is intersected by extended line 51a. As such, the two links 52 and 53 are equivalent to a single lower link (not shown) connected by horizontal axis hinge to the trailer's lower front edge 63. The arrangement shown in FIG. 8 is advantageous in that it produces the needed stability without heavy joint members.

FIG. 9 illustrated another three-link embodiment of a truck 64 and trailer 50 towing arrangement, wherein two lower links 65 and 66 do not share a common point of attachment to the truck 64, but are connected by separated ball-type joints 67 and 68. An upper link 69 may be arranged essentially as in the embodiment of FIG. 8, being connected to the truck 64 by a ball-type joint 70. Also in FIG. 9, the load is carried at a remote carrying axis 72, passing through a point 71 defined by the intersection of the line 69a of the upper link 69 and the extended lines 65a and 66a of lower links 65 and 66 (or the plane in which they lie).

When the links 65 and 66 are skewed with respect to the link 69, and their lines no longer intersect at the point 71, the load is carried from the horizontal axis 72 passing through all three lines near the point 71. Of course, this line near point 71 will shift with changes in the grade of the road, as the angles or inclination of the truck and the trailer vary with respect to one another.

The three-link system of FIG. 9 has a remote steering center as well as a remote load center. The lines of the lower links 65 and 66 intersect at a vertical or nearly vertical remote axis 73 (in the perfectly straight and level position, the point 71), and steering of the trailer 50 is essentially about said vertical or nearly vertical axis 73 therethrough, as in the first described embodiment. Of course, this axis moves laterally as the truck 64 makes turns. The rays intersecting all three links serve as virtual moving hinges about which the connected vehicles can be considered momentarily hinged to each other.

The combination of both remote carrying and steering centers provides for stability in towing and turning, which was heretofore unattainable by using connecting systems of the prior art. The present invention minimizes rise and fall in turning, by locating the upper link joint 70 at the optimal practical fore-and-aft location with respect to the lower joints 67 and 68. Pivot axes 72 and 73 can be located far forward of ball joints 66, 67, 68 compared to previous systems of the prior art which encountered rise and fall problems unless the forward distance was kept minimal.

The best location is slightly aft of a vertical plane encompassing the lower joints 67 and 68, or within that plane. In the design of a three-link system, one way of minimizing rise and fall on turning is to find that location for the upper link joint 20 that results in the trailer front's being at the same level at a preselected turning angle as it is at 0° turning angle, the stright, aligned towing position. If the two lower links are generally horizontal, the three rear ball joints for the links at the trailer front all lie generally symmetrically in a common vertical plane, and the two lower link forward joints 67 and 68 are in a common transverse vertical plane at the towing vehicle's rear, and at the same level symmetrically about a vertical longitudinal central plane through the towing vehicle, the best location for the upper link's forward joint 70 will usually be at of the transverse plane of the lower forward joints and within the central longitudinal vertical plane. This is because with two converging lower links, the center of the trailer's front will become closer to the center of the towing vehicle's rear as the trailer goes into a turn. Thus, at 30° turning angle, for example, the upper link would tend to become compressed by the turn as compared to the situation at 0°. Instead of compressing, the link of course causes the trailer's front to rise. One solution is to locate the upper link's forward joint sufficiently aft of the transverse plane containing the lower joint that the distance from that joint to the center of the trailer's front is the same at, say 30° turning angle as it is at 0°. This provides for an acceptable degree of rise and fall from 0° to 30° and beyond 30°.

The converging two lower links establish a curve of turning movement for the trailer's front which is not truly circular in any section, so the upper forward link can only be located at an approximate center. This can be done as described above, by trial and error, geometric or vectorial calculation.

As in the two-link configuration, lengthening and shortening of selected ones or all of the links is possible in the three-link configuration for offset towing or for high speed/slow speed behavior. The town and country (slow speed/high speed) modification may, again, be achieved by lengthening and shortening the links or by adjusting laterally and vertically the relative locations of the points of attachment of the links.

Rear dumping of the contents of the trailer is also an advantage of the three-link system and can be effected by lengthening the top link 69, which for this purpose may be provided with hydraulic means (not shown) to effect the dumping, and/or shortening the lower links.

Preferably, tension-only members such as chains or cables are used as the lower links 67 and 68 in the three-link system of FIG. 9. This is economical, particularly in eliminating the need for true ball joint connections at the ends of these links. Chains or cables attached to the trailer and the towing vehicle function as if connected by ball joints, and the term "ball joints" or "ball joint type connection" as used in the claims herein is intended to include this and any other type connection that functions as a ball joint.

If tension-only members are employed as the lower links, the upper link's angle of obliquity with respect to horizontal should be limited, so that on sudden stops the trailer front does not tend strongly to climb. Thus, this angle generally should not exceed about 31° to 32°. Nor should it be too shallow, or it will be subjected to tremendous forces in normal operation. A range of about 26° to 31° is preferred.

The three-link hitch is also adaptable to use on motorcycles for attaining remote steering and/or carrying axes with success not available for motorcycles in the past. This makes possible a completely new use for the motorcycle, namely as a towing vehicle for trailers, by arranging the links to converge to forward steering and carrying axes, located at low-neutral positions near the center of gravity of the motorcycle.

Four-link Systems (FIGS. 10 and 11)

FIG. 10 shows a four-link embodiment of the invention which is applicable for use with a single-wheel trailer 75. The connecting system includes a pair of upper links 76 and a pair of lower links 77. The upper links are attached to the trailer 75 at the top of a frame 78 extending upwardly from the front of the trailer, at joints 79 and are attached to a common point 81 at the rear of a towing vehicle 82. The lower links 77 are attached at a common joint 83 at the rear of the towing vehicle. Similar to the three-link embodiment shown in FIG. 8, the upper links 76 form a rigid upper triangle and the lower links 77 form a rigid lower triangle, with each triangle respectively hinged to the trailer by horizontal pivot axes through their respective pairs of upper and lower ball or pin joint mountings 79 on the trailer. The planes of the pairs of links 76 and 77 intersect in a horizontal load center axis 86 passing through the point 84. As in the three-link embodiment shown in FIG. 10, this is equivalent to a two-link hitch with upper and lower links (not shown) both connected centrally to the trailer front a horizontal-axis hinge joints, and both connected to the truck at vertically aligned ball joints 81 and 83 as shown in FIG. 10.

The configuration of FIG. 10 results in a non-remote vertical steering axis 87 passing through the link connection joints 81 and 83, and a remote carrying axis 36. The rigid upper and lower triangles restrain the trailer from twisting with respect to the fixed vertical steering axis 87.

If desired, the link arrangement of FIG. 10 could be turned 90° to have the two forward points of attachment 81 and 83 on a horizontal line, to carry loads on such a horizontal line and not at a remote point, but to steer the trailer 75 from a remote forward vertical axis, particularly for use with motorcycles. This embodiment is highly resistant to twisting forces. Again, from the standpoint of mechanics and the dynamics of movement, this variation would be equivalent to a system with two converging links in a horizontal plane, as in the first-described embodiment, but of course on a two-wheeled trailer instead of a four-wheeled trailer, and with hinge connections at the trailer.

As shown in FIG. 11, a four-link embodiment may also be arranged so that two upper links 90 converge toward each other and incline downwardly but do not have a common point of attachment to the towing vehicle 91, being connected to the truck at a pair of joints 92. Similarly, the bottom two links 93 converge toward each other but have individual points of attachment 94 to the towing vehicle, as well as to the towed vehicle 95. All joints converge in the forward direction. The points of attachment are arranged for simplest illustration so that the lines of the links intersect at a common point 96 forward in the towing vehicle 91. This point of intersection may also be defined by the planes formed by the sets of links. The remote forward point 96 defines both a remote vertical steering axis 97 and remote horizontal carrying axis 98. This configuration therefore results in the greatest stability in towing and carrying.

Again, the angle of inclination of the upper links should be at least about 26° (if the lower links are approximately horizontal) to avoid overstressing. If tension-only members are used as lower links, as discussed for the three link system, the maximum angle of inclination of the upper links should be about 31° or 32°.

With the four-link system it is possible to eliminate rise and fall upon turning completely. If the left two links (upper and lower) are in one vertical plane, and the right two links are similarly in another vertical plane, with all the upper ball joints directly in a vertical line above the respective lower ball joints, there can be no foreshortening of link lines in turning on a level surface. As can be seen from FIG. 11, at each side of the four link system are similar trapezoids formed by the four ball joints at respective sides. No angle in either trapezoid will change, even in sharp turns, so long as the vehicles remain on a level surface. Therefore there can be no rise or fall induced by turning.

For enabling deliberate jackknifing of the trailer 95 during docking operations, for example, the two upper link forward joints 92 may be at slightly different levels, and the two link forward joints 94 may be at slightly different levels, permitting the left and right links to cross over each case. Even with the joints so arranged, rise and fall on turning will still be eliminated so long as the left links and the right links remain in their respective vertical planes, converging toward the remote forward steering center 91.

Application to motorcycle towing is possible where the links are arranged to converge at a remote forward point in the motorcycle where braking and towing forces will no longer develop large jackknifing couples.

A Helicopter Carrying System (FIG. 12)

Turning to FIG. 12 it may be seen that the invention is particularly useful when applied to the carrying of suspended loads from a helicopter 100. The key to successful suspension of helicopter loads 101 is to have the load carried from a high neutral point 102 near the center of gravity of the helicopter. A remote carrying center 102 is achieved in a similar manner to the truck application, namely through the intersection of the lines on which four links 103 and 104 are attached to the helicopter 100. These links can be single tension lines—ropes or cables. The movable links 103 and 104 connect the helicopter to a rigid subframe 106 by ball joints or simple cable fittings, at both ends of each link. The load 101 is suspended from the subframe 106 by lines 107 which may be shortened or lengthened to adjust the pendulum length of the load 101 to avoid the natural periods of the helicopter's pitch and roll motions. The load 101 via its connection by multiple suspension lines 107 to the rigid subframe 106 causes the subframe to swing with the load rigidly as one body.

Three or four link configurations with corresponding triangular or rectangular rigid subframes are applicable to use with helicopters. Restoring forces of the three-link configuration are usually greater than forces from the four-link configuration because of increased kinematic freedom, but both can vary with spacing and angularity of the movable jointed links. Additional torsional stiffness of the subframe 106 with respect to the helicopter 100 can be created by making it longer and wider, while proportionally lengthening the links 103 and 104 to retain the remote carrying center 102 so that the increased spacing and angularity of the movable links will develop greater restoring force couples about a vertical axis when the subframe 106 is twisted by yawing force couples from a fishtailing suspended load 101. Such yawing forces in the load can cause roll forces in the helicopter. The suspended body turns and then swings to right and left as a consequence. If the four lines 107 are connected to four points on the suspended body, restoring couples can be established.

Figure 13:
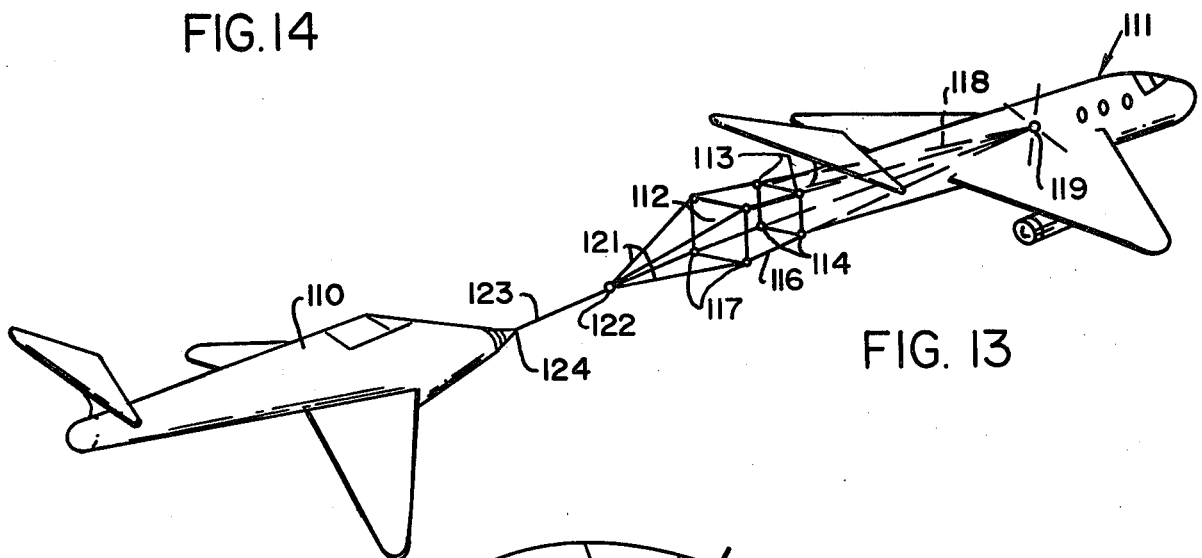
FIG. 13 is a somewhat diagrammatic perspective view of a towing aircraft connected to a smaller towed aircraft by a four-link hitch and frame of the present invention. The remote forward towing center is shown near the towing craft's center of gravity.

System for Towing a Glider by an Airplane (FIG. 13)

As indicated in FIG. 13, a similar configuration of three of four links can be used for towing a glider 110, geophysical instruments or other aircraft by fixed wing towing aircraft 111.

A rigid tubular frame 112 (triangular three-link, or rectangular four-link) is assembled behind the towing aircraft 111. A smaller but similar shape is formed by a set of connection points 113 at the rear of the towing aircraft 111, and these may be on a frame 114 formed of hinged or otherwise extensible struts erected from an opened rear door of the towing aircraft. The towing aircraft must be configured so as to have space for an adequately large frame 114. If the connection points 113 are too closely spaced, the benefits of the invention decrease significantly.

The smaller assembly 114 is connected to the larger frame 112 by movable links 116 comprising tension lines mounted by ball joints or similar connecting means at the points 114 and at connecting points 117 on the frame 112, and is proportionally scaled so that extended lines 118 of the links 116 intersect at a neutral point 119 near the towing aircraft's center of gravity. An aft line 121 extends rearwardly from each corner 117 of the rigid tubular frame 112 to a connection with a hitch point 122. The hitch point 122 is in turn connected via a single tow line 123 to an attachment point 124 on the towed aircraft 110. The aft lines 121 can extend directly to the towed craft's tow line attachment point 124 if desired, eliminating the single tow line 123.

The rigid tubular frame 112 may be collapsible for retraction into the towing aircraft 111. It may be assembleable into its rigid form by a variety of mechanical arrangements not shown in FIG. 15, including diagonal telescoping struts and air cylinders. In many applications the rigidity of the frame 112 may be maintained by the use of relatively short aft lines 121 so that the distance from the hitch junction 122 to the tubular frame assembly 112 is significantly shorter than the distance from the frame 112 to the forwaerd neutral point 119. The increased converging angularity of the aft lines 121 will induce large inward force components on the frame 112, tending to hold it together stably.

Figure 15:
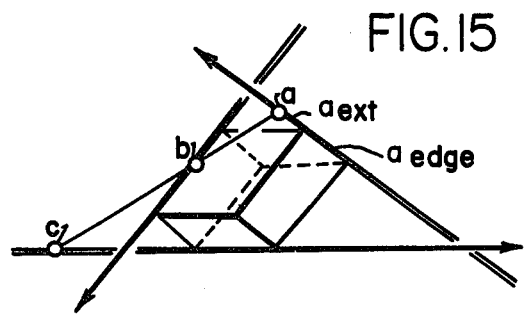
FIG. 15 is an orthographic projection of the three link axes of the hitches illustrated in FIGS. 9-14, and shows a parallelepiped defined by the link lines when skewed. It also shows a typical ray intersection all three skewed link lines.

The converging geometry of the link extension lines 118 from the frame 112 to the neutral point 119 forward in the towing craft's fuselage, and the rigidity of the frame 112 and of the pyramid structure formed from the frame 112 and the aft lines 121 are the essential features of the invention as illustrated in FIG. 15. The particular arrangement for erecting the frame 112 and the similar assembly 114 mounted at the rear of the towing aircraft 111, along with the length of the single towline 123, etc. are variable with the type of towing and towed aircraft involved, and the arrangement shown in FIG. 13 is for illustration only.

Figure 14:
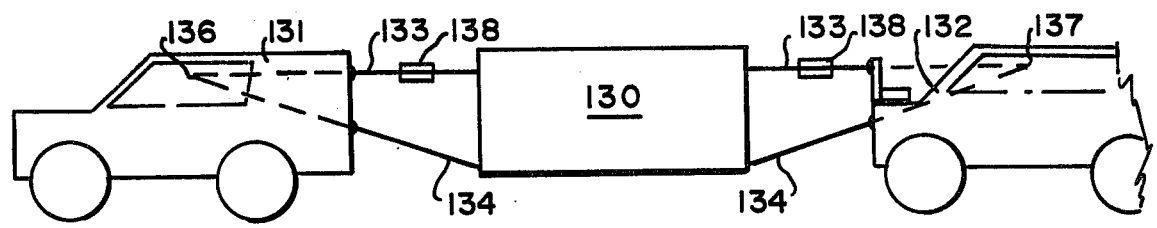
FIG. 14 is a schematic elevation view showing another application of the invention, whereby a containerized cargo load is suspended between the rear of one vehicle and the front of another by three or four link hitches.

System for Carrying a Load Between Two Vehicles (FIG. 14)

FIG. 14 shows an application of the principles of the invention for carrying a load 130, usually a containerized load, between two vehicles 131 and 132. The load 130 is suspended by upper and lower links 133 and 134 from the rear of the front vehicle 131 and from the front of the rear vehicle 132. Both preferably are powered vehicles. As illustrated, the remote carrying axes may and usually will be arranged higher on the carrying vehicles than shown in the previous embodiments, to give the container more natural stability against capsizing to either side. Also, the lower links 134 may be angled obliquely upwardly toward both towing vehicles as shown, in order to increase stability.

The link connecting systems may be three-link or four-link systems, as described above in connection with FIGS. 9 and 11. This establishes remote forward carrying and steering centers as at 136 in the front vehicle 131, and remote rear carrying and steering centers as at 137 in the rear vehicle 132. One of the vehicles can be connected by a twist-resistant arrangement, such as in FIG. 10, when the load is not stable from gravity alone.

This system of transporting a non-wheeled load is important in that it enables a very heavy load to be moved over rough terrain by two vehicles designed for such terrain, particularly in military operations. Also, hydraulic or mechanical link-lengthening or shortening arrangements can easily be incorporated in either the lower links 134 or the upper links 133 for lowering the load 130 at a remote deployment site, without the need for cranes, lift-trucks, etc. Similarly, the load 130 can be raised to the transport position shown simply by changing link lengths.

For example, the load, resting between the vehicles in a lower position that that shown, might be raised by shortening the bottom tension link(s) 134 or by lengthening the top compression link(s) 133. This can be accomplished by a hydraulic piston-and-cylinder arrangement or by a simple motor-driven or manual screw-thread, such as the screw-threaded sleeve 138 shown on each of the upper links 133. The sleeve 138 has opposite-handed threads at either end, engaging mating threads on the links 133, which comprise separate forward and rearward rods in each case, drawn closer together by rotation of the sleeve 138. When the load 130 is to be lowered, the sleeves 138 are rotated in the opposite direction to decrease the length of each upper link 133.

The same arrangement can be used on the lower links 134, which may be preferable in the case of three-link systems where only one lower link 134 is included at each end of the load 130.

In the various forms of the invention including three and four links for connecting a powered vehicle to a non-powered vehicle, load or body, pure tension links can be used as the lower links. Thus, chains or cables can conveniently be used. Similarly, the upper links can comprise pure compression members, yieldable and extensible in a tension situation. Such upper links may be, for example, telescopable rod systems which are rigid in comparison but extendable in tension. Elastic springs and similar devices can be combined with both forms to change their unloaded state to a yielding spring-loaded state when this is desired for increased stiffness or other practical reasons.

The advantages to use of pure tension or pure compression links are simplicity and economy (in the case of chains or cables as lower links), and the ability to include redundancy for safety. Thus, any number of lower tension-only links may be included as lower links, since they will not inhibit the freedom of movement of the system. The same is true for pure compression members as upper links on a "four-link" system—additional redundant links can be included between the outer two. At any instant of turning or of pitch movement (i.e., relative rotation of the two bodies about vertical or transverse horizontal axes), or even at rest, only two upper links and two lower links will be carrying the load. The rest will be slack.

In twisting movements, as over a rough road, where relative rotation of the two bodies about a longitudinal horizontal axis takes place, the four-link form of the invention can accomodate such movement if it includes tension-only or compression-only members as discussed above. The four-link system has only two degrees of freedom, as further explained below, i.e. freedom of movement about a vertical axis (turning) or yaw and about a transverse horizontal axis (pitch on hillcrests or driveways, e.g.). However, it will be shown that the three-link system has three degrees of freedom, also including relative movement about the longitudinal axis (twist).

On the Need for Lines of Intersection

Until shown a model, competent observers sometimes express doubts that the invention is capable of supporting its load because it is free to rotate, or, because it resembles a tripod, or worse, a quadrupod, or it would be rigidly incapable of movement, or, because of apparently redundant members, would require extreme precision in its manufacture in order to function freely. These doubts and many inoperable disclosures of the prior art stem from mistaken or guessed notions of the invention's principles. Once seen, the models function so freely that the same observers, still without understanding, accept the models as obvious, and fail to perceive invention in the mechanisms that they previously doubted would work, and, unfortunately, forget their earlier doubts, without knowing that incorrect models of similar appearance can easily collapse or lock up under changing loads and movements.

The sometime functioning of prior proposed devices differently than claimed is usually traceable to claims of rotation of the connected vehicles about points or axes of intersection that did not exist, or continue to exist, or have the same direction or location as that assumed by the prior art disclosure in the initial positioning of the two vehicles.

These problems cannot be treated by reference because, to my knowledge, an adequate kinematic theory of these multi-link hitches is not available in current textbooks. Consequently the geometric analysis that follows, although separable from the present invention, is needed for valid understanding of its principles and rational definition of its boundaries.

Feasibility of the invention depends upon the existence, direction, and location of axes intersecting the lines of all two, three, four or five links connecting the two vehicles, in all attitudes necessary to their operational use.

The necessity of these axes can be seen because the front assembly of ball joints is fixed in a rigid body, and the rear assembly of ball joints is fixed in another rigid body; consequently an axis is needed for one rigid body to rotate with respect to the other.

The sufficiency of any axis intersecting all two, three, four or five link lines can be seen because the links are inextensible, hence movement of each and all ball joints of either vehicle with respect to the other, fixed, vehicle is possible in and only in directions perpendicular to the link line of each ball joint. Consequently, rotation about or translation parallel to axes intersecting all link lines, and no other axes, satisfies the compounded condition that all ball joints on the moving vehicle move together as a rigid body in directions perpendicular to the link line of each.

It follows from this necessary condition for rotation that, if two link lines intersect, then all feasible axes for rotation must lie in the plane of the two link lines in order to intersect them, or pierce that plane at the point where they intersect, and also intersect the remaining link lines while lying in that plane or passing through that point of intersection.

If follows that claims that a multi-link hitch permits a trailing vehicle to turn about a vertical axis through the intersection point of two links become untrue whenever the remaining link lines fail to intersect that vertical axis. In sharp turns, remaining link lines commonly miss the vertical axis by a wide margin, and if improperly arranged can cause significant and undesirable rise and fall of the trailer during these sharp turns, or cause the hitch to collapse when compressive loads are induced in tension links such as chains, or tensile loads are induced in one-way compressive links such as open-socketed struts or one-way open-ended hydraulic cylinders.

The necessary condition for rotation can become illusory when links of the connected vehicles are pictured for initial explanation with all link lines plausibly intersecting at a point about which rotation is presumed. Slight movement of either vehicle from this initial position causes the link lines to become skewed. They no longer intersect in the envisioned points, and pairs of lines no longer lie in the same plane for other lines or planes to intersect.

For example: In addition to two, three, or four link hitches, one could envision a six link hitch pictures with all link lines intersecting plausibly at the ideal point chosen for illustration, most likely shown in the straight towing position. However, such hitches of six or more links are generally unfeasible because, as will be seen, the movement from the pictured position can only be infinitesimal. Finite rotation would require that some of the links change length to release the hitch from lock-up due to contradictory forces. Of course, there are special cases where six or more links would not jam or lock up. For example, if in the four-link configuration of FIG. 11, two links were added in the same plane as two existing links, one degree of freedom (rotation about one axis) would remain. The same would be true if one link were added in each of the planes containing the top two and the bottom two links, or to each of the opposite side link planes. Addition of one link to each of a top (or bottom) link plane and a side link plane would result in lock-up.

If extra chains are added as tension links, or extensible struts are added for compression links to make a six-link hitch, the extra links become slack or yield as discussed above, because only five or fewer inextensible links can be determinately loaded with hitch forces at any time, with one degree of freedom for five links (not illustrated), two degrees of freedom for four links, and three degrees of freedom for three links.

Combined Rotations

When all link lines are intersected by two or more axes, combined rotation can take place about any axis perpendicular to the normal to two component axes, and more generally, about any axial direction in the space spanned by several component axes. The direction of the combined axis is determined by summing the linear combination of small rotations about component axes, and the location of the combined axis is determinate from the condition that the vector movement of its rotation about any convenient point in the fixed body is equal to the sum of vector moments of the small component rotations about that point.

Statical Determinacy

Since these combined rotations are about determinate axes, it follows that all hitch reactions are statically determinate whenever the loads and reactions of the trailed vehicle are statically determinate, because the combined axis of rotation is a virtual structural hinge. Statical determinacy follows because the summed moments of all loads and reaction on either vehicle, considered as a free body about that hinge, must equal zero.

From this statical determinacy, it follows that the forces on individual links are statically determinate whenever appropriate axes exist so that the link assembly is unlocked and uncollapsed. The links, therefore, are free of internal stress and are loaded independently of any slack or looseness in their manufacture. Expedient hitches, therefore, such as a four link hitch formed from two upper fence posts, and two lower cables, can be made at a site for recovery of a disabled vehicle.

Two Link Systems

Since, from every point on each of two skewed link lines, every point of the other line can be seen, the existence of a doubly infinite set of rays connecting each point of one line with each point of the other is obvious from inspection.

Three Link Systems—Parallelepiped Defined by Three Skewed Lines

Skewed lines, although not parallel, never meet because they lie in different parallel planes. Every pair of skewed lines defines a unique pair of such parallel planes, each plane containing one line and being parallel to the other.

Every triplet of three skewed lines therefore defines a unique parallelepiped bounded by three sets of parallel planes defined by the three pairs of lines contained by the set of three skewed lines. See FIG. 15 where a parallelepiped defined by three skewed lines is shown in orthographic projection.

Every ray intersecting all three skewed lines must intersect the middle one in the segment where it forms an edge of the parallelepiped.

This can be seen because for a ray intersecting two of the skewed link lines to intersect the third line in the ray segment between the outer two lines, it must do so between the two parallel planes that contain them, hence in the segment of the third line between those parallel planes, hence in the segment that forms an edge of the parallelepiped.

The first or ab part of the ray shown in FIG. 15 cannot enter the space between the pair of planes defined by lines b and c because that space must be traversed by the second or bc part of the ray; therefore, the a end of the ray segment must lie outside the parallelepiped. Similarly, the other or c end of the ray segment must also lie outside the parallepiped.

It follows that no ray intersecting three skewed lines can enter their parallelepiped and that every ray intersecting three skewed lines lies outside their parallelepiped except for the single point where it intersects the middle skewed line in an edge of the parallelepiped.

On link line a in FIG. 15, let $a_{ext}$ be the external segment of line a between the external ray intersection and the parallelepiped and $a_{edge}$ be the segment forming an edge of the parallelepiped. On link line c, let $c_{ext}$ and $c_{edge}$ be defined similarly.

From elementary geometry, link line a, and ray abc both pass through point a and hence are cut into proportional segments by the pair of planes parallel to link lines b and c, therefore $$\frac{a_{ext}}{a_{edge}} = \frac{ab}{bc}$$

Link line c and ray abc both pass through point c and are similarly cut into proportional segements by planes parallel to link lines a and b, therefore $$\frac{c_{edge}}{c_{ext}} = \frac{ab}{bc}$$

Equating the proportions and cross-multiplying yields the fundamental relation $$a_{ext}\, c_{ext} = a_{edge}\, c_{edge}$$

Two similar relations are easily obtained by interchanging letters a, b and c to yield forms for the other cases where the middle intersection of a ray lies on link line a or c.

The same proportions given by these relations hold true not only for true lengths of these line segments in space, but also for scaled orthographic projections of these line segments on ordinary engineering drawings. Consequently, by choosing a point a in FIG. 15, and measuring the projected lengths on the drawing of $a_{edge}$, $a_{ext}$ and $c_{edge}$, a simple calculation yields the correct drawing length of $c_{ext}$ to correctly locate point c, and by intersection, point b, on the drawing.

Figure 16:
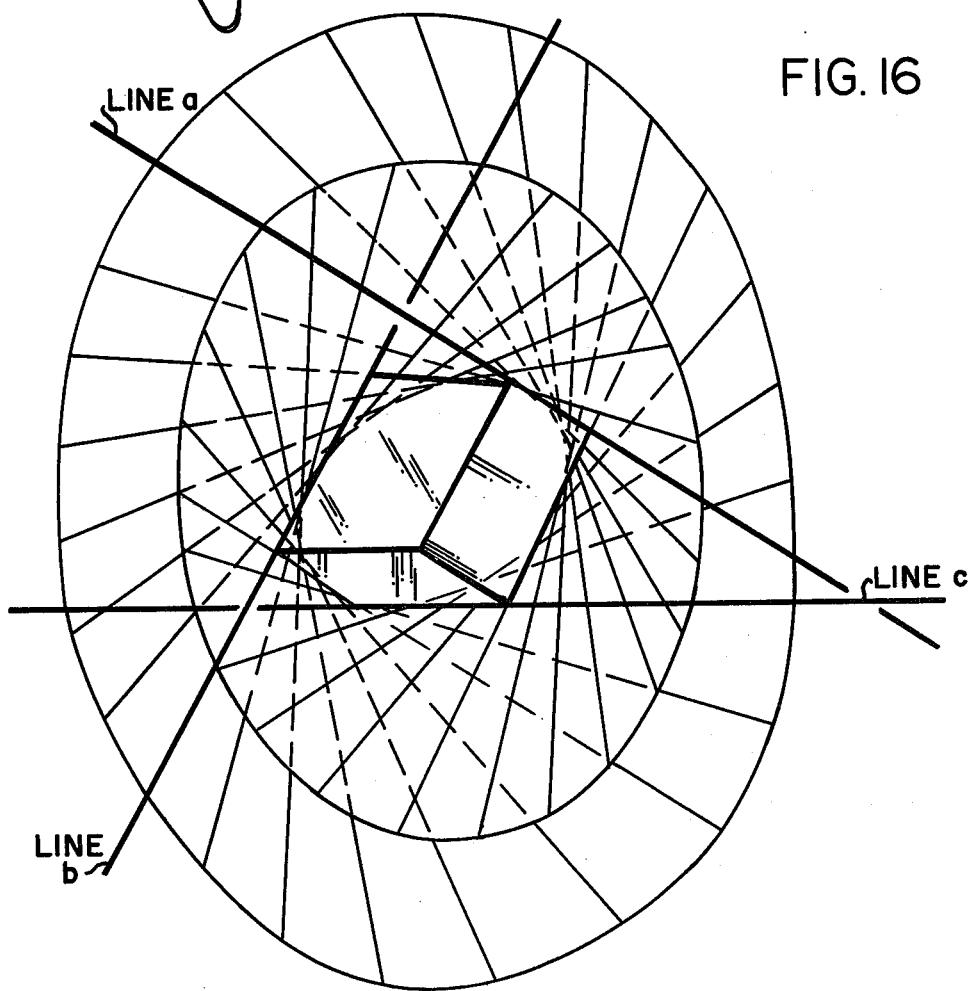
FIG. 16 is an orthographic projection illustrating a parallelepiped defined by three skewed link lines and the elliptic hyperboloid defined by the envelope of rays intersecting the three skewed lines.

Using the foregoing procedure, a continuous family of rays intersecting any set of three skewed lines can be constructed to obtain FIG. 16. From the figure constructed in this manner, and later by vector algebra, the envelope of rays intersecting three skewed lines is seen to be a familiar ruled quadric surface, an elliptic hyperboloid of one sheet.

It follows that a trailing vehicle joined by three skewed links to a towing or carrying vehicle has three degrees of freedom for the axial direction of its rotations because it can rotate about an axis parallel to the direction of any vector that can be formed as a linear combination of direction vectors of any three skewed rays lying upon the hyperboloidal envelope.

If the parallelepiped becomes degenerate, however, or, more clearly for illustration, if two of the link lines intersect, the desired axis of rotation must be compounded either from axes lying in the plane of the intersecting links and passing through the point where the plane is intersected by the third link line; or compounded from axes passing through the point of intersection and lying in the plane of that point and the third link line; or by combination of axes from both.

In the latter case, let the two bottom link lines intersect, for example. The upper link line will usually be to one side of a vertical line through the intersection during a sharp turn and therefore the plane of available axes for turning will lie in the plane of the intersection point of the lower links and the upper line, off to one side of the third link. A vertical axis can be formed by combining one of these canted axes with an axis from the other set, forward where the upper link line intersects the horizontal lane of the two lower intersecting link lines. The angular compensation needed to create a vertical axis for turning will be formed from the sum of the axial rotations, but the amount of lateral or vertical shift of the hitch from each of the component rotations will be proportional to the distance of each axis from the hitch. If follows that when the third link is far to one side of the intersection point of the two lower links, as in a sharp turn, and the point where the third link intersects the plane of the two lower links is far forward of the hitch assembly, the secondary rotations about axes through the forward point will cause large rise and fall movements of the hitch end of the trailed vehicle during a sharp turn. The combined vertical axis of rotation will be shifted away from the intersection of the lower links in proportion to the distance and amount of the component rotations.

A posteriori, it is possible to relocate ball joint mountings to avoid critical combinations, by reducing the sideward offset of the upper link in a sharp turn and the excessive forward distance of the point where it intersects the plane of the lower links. When ordinary chains are used for lower links, the above conditions, when extreme, can cause stress reversal on the chain on the inside of the turn, causing the hitch to collapse from the chain's inability to resist compressive stress loads.

Similar turning phenomena can appear in the more general case, when two lower links do not intersect, and the planes of the link lines form an extremely skewed parallelepiped; but from the absence of simply defined points for collecting the rays of discussion, these cases are not amenable to clear verbal explanation. These more general conditions can be investigated and adjusted by the vector methods given in the appendix.

Four Link Systems

The pivoting freedom of a four link assembly depends upon where the fourth link line is located. Let the fourth or "d" link line be perpendicular to the drawing so that it can be represented by a dot in FIG. 16.

If the dot is drawn inside the elliptical hole in the hyperboloid, it will not intersect any of the rays that intersect the other three link lines, so the four-link assembly will be locked, and incapable of movement.

If the dot touches the boundary of the elliptical hole, pivoting of all four links is possible about the single ray of the hyperboloid that intersects at that point. If the dot is drawn outside the elliptical hole, the fourth or "d" line will pierce the hyperboloid surface in two places, and can rotate about an axis formed from any linear combination of the two rays it intersected at the piercing points.

If the fourth of "d" link line is drawn as a line similar to the a, b, and c lines in FIG. 16, it can pass outside the hyperboloid and be locked, or it can be tangent to the hyperboloid and pivot about the single ray passing through the point of contact, or the "d" link line can pierce the hyperboloid surface in two places and the hitch can then pivot about a linear combination of the two rays of the hyperboloid it intersected at the piercieng points. The combined axis can be in any direction perpendicular to the line that is perendicular to both component rays, and will intersect that line which occurs where the two component rays become nearest, at the "throat" of the hyperboloid.

Summary of Two, Three, Four and Five Link Hitch Geometry

1. The two link hitch can pivot and twist in any direction but cannot carry loads (vertical loads when the two links lie nearly in a horizontal plane). In a near-horizontal configuration, the two link hitch is useful for towing only, but its stability and off-tracking can be varied for useful purposes by varying the separation of either the forward or rear ball joint mountings, and it can be deliberately off-tracked to either side by changing the length of one of the links.

2. If all three links of a three link hitch are connected to a common ball joint, all pivoting will be about that ball joint; no remote axis is possible.

If two of the links are joined to a common ball joint, all pivot axes will pass through the common joint or lie in the plane of the two links it joins, passing through the point where the third link intersects the plane of the other two.

If three links are joined to separate ball joints pivoting can take place in any direction unless two of the link lines intersect in which case pivoting axes must lie in the plane of the two intersecting lines of pass through their point of intersection. Initial arrangements of three links with three separate ball joints at each vehicle can be arranged so that the link lines lie in planes and converge to points, but since simultaneous motion in three different planes is impossible, these planes and point intersections must vanish when the hitch is disturbed from its initial position.

The three link hitch can be proportioned by adjusting and varying its ball joint locations to give desirable characteristics and avoid excessive distance between steering and carrying axes that would cause rise and fall during turning maneuvers or stress reversal of one-way tension or compression links. The location of the third, upper link connection to the towing vehicle can be adjusted fore-and-aft to minimize rise and fall on turning.

3. The four link hitch can function freely or become locked dependingupon where the fourth link is located. From symmetry, it can easily keep nearly vertical turn axes when upper link lines or lower link lines intersect and therefore, for similar convergence of the link lines, can avoid stress reversal, when the lower links are ordinary chains, over a wider range of sharp turns than the three link hitch. The necessity that all pivoting axes pass through the common ball joint, when two or more links are so joined, is the same as for three link hitches and does not, therefore, require separate explanation.

4. Hitches formed from five or more inextensible links are less versatile because the fifth link line must intersect the hyperboloid of the first three link lines in the same manner that it was pierced by the fourth link line, and must continue to do so during pivoting that moves it and the fourth line in different directions. The three hyperboloid links and the fourth link can move about axes in a ruled surface with two degrees of freedom; the three hyperboloid links and the fifth link can similarly move with two degrees of freedom. Both together can move about the single axis where the two ruled surfaces intersect. Consequently a five link embodiment has only a single degree of freedom, and will usually appear as a modification for connecting or erecting one of the other types, or for preventing jackknifing during pushing or braking maneuvers. Such a fifth link must intersect one of the two lines that intersect all four other link lines.

5. Hitches formed from six or more inextensible links are not mechanically feasible (except as discussed above, with links arranged in common planes). Except for the singular point where all link lines can be drawn to intersect, they are mechanically locked. Any slight movement from this point places the sixth link line where it cannot intersect the single axis of the five link assembly, hence it acts as a lock upon the other five links. Its only application will be fore locking one of the other types for supporting it when not connected to a tractor.

6. Conflicting needs for stability, traction, maneuverability, and the change of needs for different operational requirements do not define any single ideal location of turning and carrying axes. The present invention is conceived to be adjustable and variable for widely different locations as needed.

Appendix 1. Link Positions (see FIG. 17)

Figure 17:
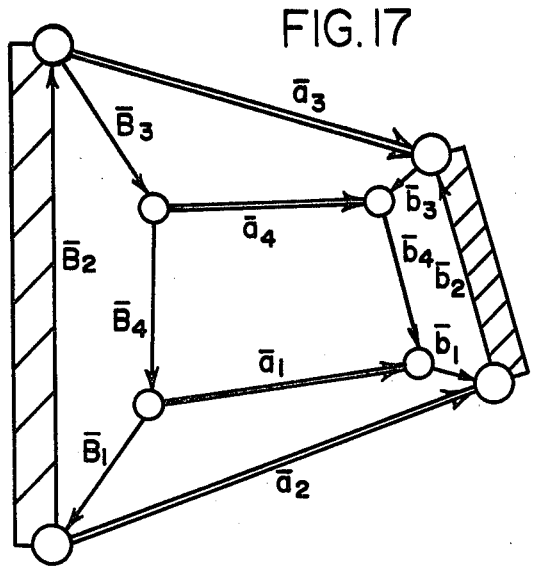
FIG. 17 is a perspective diagram of a vectorial model of the link-and-ball hitch locations of the invention for defining link vectors as used in mathematical calculations.

From the fixed location of ball joint mountings on towing and trailing vehicles, the relative location of base vectors linking the ball joints in each set can be found by dyadic or matric rotation of each assembly of vectors to conform to the desired orientation of the two vehicles. In this way base vectors $B_i$ between ball joints on the trailing vehicle are presumed known, and similar base vectors $b_i$ between ball joints on the towing vehicle and the squared lengths $a_i^2$ of link vectors $a_i$ between front and rear ball joints also presumed known. In FIG. 17 these vectors are pictured for four or fewer links, as desired.

For two link assemblies, the difference in height between ball joints at both ends of the links must also be specified to define the system for calculation.

Therefore for $n = 2, 3$ or $4$ links in FIG. 17, the first problem is to find links $a_i$, given their squared lengths $a_i^2$ and the base vectors $B_i$ and $b_i$ that define the relative positions of ball joint mountings on the front and rear vectors in the chosen orientation of the vehicles.

From FIG. 17, the relations $$\overline{a_i} + \overline{b_i} - \overline{a_{i+1}} - \overline{B_i} = \overline{O} \qquad (1)$$

yield difference-vectors $$\overline{d_i} = \overline{B_i} - \overline{b_i} = \overline{a_i} - \overline{a_{i+1}} \qquad (2)$$

Dot squaring $\overline{a_{i+1}} = \overline{a_i} - \overline{d_i}$ yields $a_{i+1}^2 - 2\overline{a_i} \cdot \overline{d_i} + d_i^2$ from which $$\bar{a}_i \cdot \bar{d}_i = \frac{a_i^2 - a_{i+1}^2 + d_i^2}{2} = f_i \tag{3}$$

Similarly dot squaring $\bar{a}_i + \bar{d}_{i-1} = \bar{a}_{i-1}$, and rearranging terms yields $$\bar{a}_i \cdot \bar{d}_{i-1} = \frac{a_{i-1}^2 - a_i^2 - d_{i-1}^2}{2} = g_i \tag{4}$$

Note: For n=2 links define $\bar{d}_o = \bar{d}_2 = \hat{K}$ a vertical vector so $\bar{a}_i \cdot \bar{d}_o = \bar{a}_i \cdot \hat{K}$ = difference in elevation between ends of link $\bar{a}_i$ and $\bar{a}_2 \cdot \bar{d}_2 = \bar{a}_2 \cdot \hat{K}$ = difference in elevation between ends of link $\bar{a}_2$ From (3) and (4) $\bar{a}_i \cdot \bar{d}_i = f_i$ and $\bar{a}_i \cdot \bar{d}_{i-1} = g_i$ from which $\bar{a}_i \cdot \bar{d}_i \bar{d}_{i-1} = f_i \bar{d}_{i-1}$ and $\bar{a}_i \cdot \bar{d}_{i-1} \bar{d}_i = g_i \bar{d}_i$ By subtraction $\bar{a}_i \cdot (\bar{d}_i \bar{d}_{i-1} - \bar{d}_{i-1} \bar{d}_i) = f_i \bar{d}_{i-1} - g_i \bar{d}_i$ By vtp rule $\bar{a}_i \times (\bar{d}_{i-1} \times \bar{d}_i) = f_i \bar{d}_{i-1} - g_i \bar{d}_i$ whence $(\bar{d}_{i-1} \times \bar{d}_i) \times [\bar{a}_i \times (\bar{a}_{i-1} \times \bar{d}_i)] = (\bar{d}_{i-1} \times \bar{d}_i) \times (f_i \bar{d}_{i-1} - g_i \bar{d}_i)$ By vtp rule $(\bar{d}_{i-1} \times \bar{d}_i)^2 \bar{a}_i - \lambda_i \bar{d}_{i-1} \times \bar{d}_i = (\bar{d}_{i-1} \times \bar{d}_i) \times (f_i \bar{d}_{i-1} - g_i \bar{d}_i)$ from which $(\bar{d}_{i-1} \times \bar{d}_i)^2 \bar{a}_i = (\bar{d}_{i-1} \times \bar{d}_i) \times (f_i \bar{d}_{i-1} - g_i \bar{d}_i) + \lambda_i \bar{d}_{i-1} \times \bar{d}_i$ Dot squaring yields $$(\bar{d}_{i-1} \times \bar{d}_i)^4 a_i^2 = [(\bar{d}_{i-1} \times \bar{d}_i) \times (f_i \bar{d}_{i-1} - g_i \bar{d}_i)]^2 + \lambda^2 (\bar{d}_{i-1} \times \bar{d}_i) \tag{5}$$

from which $$\lambda_i^2 = (\bar{d}_{i-1} \times \bar{d}_i)^2 a_i^2 - \frac{[(\bar{d}_{i-1} \times \bar{d}_i) \times (f_i \bar{d}_{i-1} - g_i \bar{d}_i)]^2}{(\bar{d}_{i-1} \times \bar{d}_i)^2} \tag{6}$$

With $\lambda$ known, (5) yields $$\bar{a}_i = \frac{(\bar{d}_{i-1} \times \bar{d}_i) \times (f_i \bar{d}_{i-1} - g_i \bar{d}_i) + \lambda_i \bar{d}_{i-1} \times \bar{d}_i}{(\bar{d}_{i-1} \times \bar{d}_i)^2} \tag{7}$$

Appendix 2: Lines of Intersection (See FIGS. 18, 19 and 20)

Figure 18:
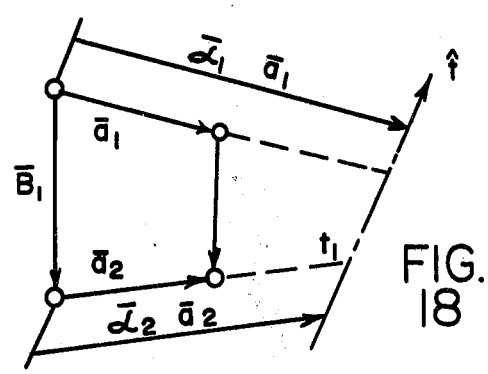
FIG. 18 is an orthographic projection of the skewed link vectors and rear base vector between ball-hinge mountings of a two-link form of the present invention, illustrating a pivot axis intersected by the two skewed link lines.

2 Link System (FIG. 18)

Let known link vectors $a_1$ and $a_2$ and base vector $B_1$ be arranged as in FIGS. 17 and 18.

Let $\alpha_1$, and $\alpha_2$ be multipliers by which link vectors $a_1$ and $a_2$ are extended to the point where the link lines are intersected by a transverse ray in any given direction $\hat{t}$.

Then, from the FIG. 11:

$$\alpha_1 \bar{a}_1 - t_1 \hat{t} - \alpha_2 \bar{a}_2 - \bar{B}_1 = O \tag{1}$$

Dotting by $a_2 \times \hat{t}$ yields $$\alpha_1 \bar{a}_1 \cdot \bar{a}_2 \times \hat{t} - B_1 \cdot \bar{a}_2 \times \hat{t} = O \tag{2}$$

from which $$\alpha_1 = \frac{\bar{B}_1 \cdot \bar{a}_2 \times \hat{t}}{\bar{a}_1 \cdot \bar{a}_2 \times \hat{t}}$$

Then, from (1):

$$\alpha_2 \bar{a}_2 = \alpha_1 \bar{a}_1 - t_1 \hat{t} - \bar{B}_1 \tag{3}$$

Figure 19:
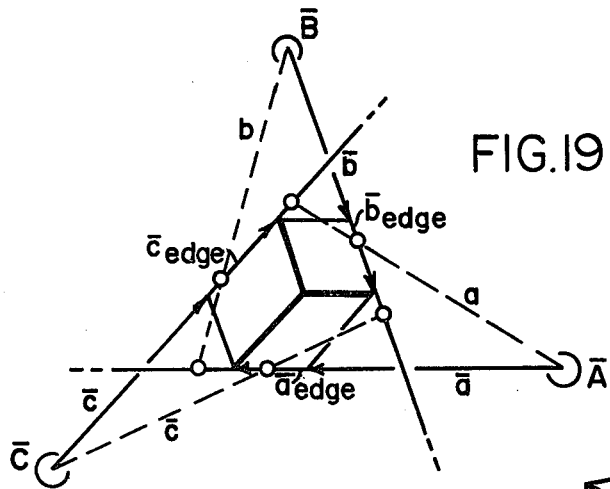
FIG. 19 is an orthographic projection illustrating a vectorial model of a three-link form of the invention for an accompanying analysis of three-link towing systems of the invention.

Three Link Systems (FIG. 19)

Locating the Parallelepiped of Three Skewed Lines: $\bar{A}$, $\bar{B}$ and $\bar{C}$ are given ball joint locations on link lines in given directions a, b and c From FIG. 19

$$\bar{A} + \bar{a} + \bar{c}_{edge} - \bar{b}_{edge} - \bar{b} = \bar{B} \tag{1}$$

$$\bar{B} + \bar{b} + \bar{a}_{edge} - \bar{c}_{edge} - \bar{c} = \bar{C} \tag{2}$$

$$\bar{C} + \bar{c} + \bar{b}_{edge} - \bar{a}_{edge} - \bar{a} = \bar{A} \tag{3}$$

Post-dot (1) by $\hat{b} \times \hat{c}$ $\hat{a}$ to get $$\bar{a} = \frac{(\bar{B} - \bar{A}) \cdot \hat{b} \times \hat{c}}{\hat{a} \cdot \hat{b} \times \hat{c}} \hat{a} \tag{4}$$

Post-dot (2) by $\hat{b} \times \hat{c}$ $\hat{a}$ to get $$\bar{a}_{edge} = \frac{(\bar{C} - \bar{B}) \cdot \hat{b} \times \hat{c}}{\hat{a} \cdot \hat{b} \times \hat{c}} \hat{a} \tag{5}$$

Permute Letters $\bar{a}$, $\bar{b}$ and $\bar{c}$ cyclicly in (4) and (5) to obtain b, $b_{edge}$, c and $c_{edge}$.

Axes of Rotation for Three-Link Systems (see FIG. 19)

Let $\bar{t}_a = \bar{a} + \bar{a}_{edge} - \bar{b}_{edge} + \bar{c}_{edge} + c_{ext}$. $\hat{c}$ be the ray segment abc from ball joint A to link line C, connecting the lines in abc order.

From the relation $$c_{ext} = \frac{a_{edge} c_{edge}}{a_{ext}}$$

the point where ray a intersects line c can be located by its distance $c_{ext}$ from the parallelepiped.

Similar rays can be constructed from ball joints $\bar{B}$ and $\bar{C}$ to obtain the three rays of rotation axes through the given ball joints.

$$\bar{\rho}_a = \bar{A} + t_a \bar{t}_a$$

$$\bar{\rho}_b = \bar{B} + t_b \bar{t}_b$$

$$\bar{\rho}_c = \bar{C} + t_c \bar{t}_c$$

($t_{a,b,c}$ variables)

All differentially small rotations of the three-link system will be linear combinations of these rays through the three given ball joints.

Figure 20:
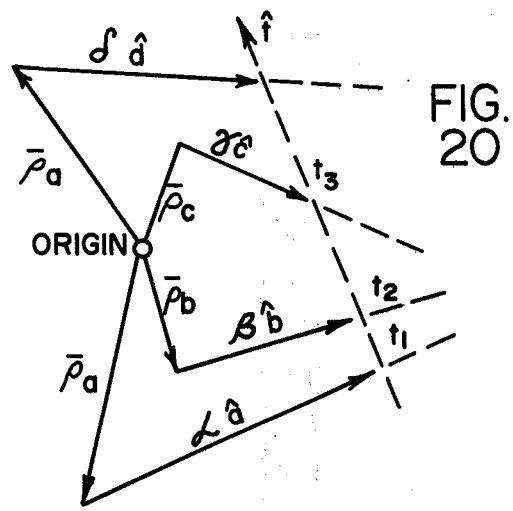
FIG. 20 is a mathematical diagram for an accompanying analysis of four-link towing systems of the invention.

Four Link Systems (FIG. 20)

To find the transversals $\rho = \bar{\rho}_a + \alpha a + t\hat{t}$ intersecting four given skewed lines:

$$\bar{\rho} = \bar{\rho}_a + \alpha \hat{a} \tag{1}$$

$$\bar{\rho} = \bar{\rho}_b + \beta \hat{b} \tag{2}$$

$$\bar{\rho} = \bar{\rho}_c + \gamma \hat{c} \tag{3}$$

$$\bar{\rho} = \bar{\rho}_d + \gamma \hat{d} \tag{4}$$

where $\hat{a}$, $\hat{b}$, $\hat{c}$, $\hat{d}$ and $\bar{\rho}_a$, $\bar{\rho}_b$, $\bar{\rho}_c$ and $\bar{\rho}_d$ are given constants.

From the figure:

$$\bar{p}a + \alpha\hat{a} + t_1\hat{t} - \beta\hat{b} - \bar{p}b = \bar{O} \quad (5)$$

$$\bar{p}a + \alpha\hat{a} + (t_1+t_2)\hat{t} - \delta\hat{c} - \bar{p}c = \bar{O} \quad (6)$$

$$\bar{p}a + \alpha\hat{a} + (t+t_2+t_3)\hat{t} - \gamma\hat{d} - \bar{p}d = \bar{O} \quad (7)$$

Dotting (5) by $\hat{b} \times \hat{t}$ yields $(\bar{p}a + \alpha\hat{a} - \bar{p}b) \times \hat{b}\cdot\hat{t} \equiv \bar{B}\cdot\hat{t} = O \quad (8)$ Dotting (6) by $\hat{c} \times \hat{t}$ yields $(\bar{p}a + \alpha\hat{a} - \bar{p}c) \times \hat{c}\cdot\hat{t} \equiv \bar{C}\cdot\hat{t} = O \quad (9)$ Dotting (7) by $\hat{d} \times \hat{t}$ yields $(\bar{p}a + \alpha\hat{a} - \bar{p}d) \times \hat{d}\cdot\hat{t} \equiv \bar{D}\cdot\hat{t} = O \quad (10)$ From (8) and (9) $\bar{B} \times \bar{C}$ is parallel to $\hat{t}$, and from (9) and (10) $\bar{C} \times \bar{D}$ is parallel to $t$, hence they are mutually parallel and therefore:

$$(\bar{B} \times \bar{C}) \times (\bar{C} \times \bar{D}) = \bar{O}$$

whence by the vector triple product rule $\bar{B} \times \bar{C}\cdot\bar{D}\bar{C} = \bar{O}$ from which $\bar{B} \times \bar{C}\cdot\bar{D} = \bar{O}$ or $\bar{C} = \bar{O}$ If $\bar{C} = \bar{O}$ then $(\bar{p}a + \bar{a}a - \bar{p}c) \times \hat{c} = [\gamma\hat{c} \times \hat{c} - (t_1+t_2)\hat{t} \times \hat{c}] = \bar{O}$ and therefore $(t_1+t_2)\hat{t} \times \hat{c} = \bar{O}$ from which either $t_1 + t_2 = \bar{O}$ and a and c intersect, contrary to hypothesis, or $\hat{t} \times \hat{c} = O$ in which case $\hat{t}$ is parallel to $\hat{c}$ and, by hypothesis, cannot intersect all four lines.

If $\bar{B} \times \bar{C}\cdot\bar{D} = O$, substituting from (8), (9) and (10) yields $$[(\bar{p}a + \alpha\hat{a} - \bar{p}b) \times \hat{b}] \times [(\bar{p}a + \alpha\hat{a} - \bar{p}c) \times \hat{c}]\cdot[(\bar{p}a + \bar{a}a - \bar{p}d) \times \hat{d}] = \bar{O} \quad (11)$$

Expanding the products of (11) yields a scalar quadratic equation $$\left\{\begin{array}{l} [(\bar{p}a - \bar{p}b) \times \hat{b}] \times (\hat{a} \times \hat{c}) \cdot (\hat{a} \times \hat{d}) \\ + (\hat{a} \times \hat{b}) \times [(\bar{p}a - \bar{p}c) \times \hat{c}] \cdot (a \times \hat{d}) \\ + (\hat{a} \times \hat{b}) \times (\hat{a} \times \hat{c}) \cdot [(\bar{p}a - \bar{p}d) \times \hat{d}] \end{array}\right\} \alpha^2 + \quad (12)$$

$$\left\{\begin{array}{l} (\hat{a} \times \hat{b}) \times [(\bar{p}a - \bar{p}c) \times \hat{c}] \cdot [(\bar{p}a - \bar{p}d) \times \hat{d}] \\ + [(\bar{p}a - \bar{p}b) \times \hat{b}] \times (a \times c) \cdot [(\bar{p}a - \bar{p}d) \times \hat{d}] \\ + [(\bar{p}a - \bar{p}b) \times \hat{b}] \times [(\bar{p}a - \bar{p}c) \times \hat{c}] \cdot (\hat{a} \times \hat{d}) \end{array}\right\} \alpha +$$

$$[(\bar{p}a - \bar{p}b) \times \hat{b}] \times [(\bar{p}a - \bar{p}c) \times \hat{c}] \cdot [(\bar{p}a - \bar{p}d) \times \hat{d}] = 0$$

Solving (12) yields two imaginary or two real roots $\alpha_i$. For each real root $\alpha_i$, a unit vector $\hat{t}$ can be constructed in the direction of $\bar{B} \times \bar{C}$, equivalently, in the direction of $\bar{C} \times \bar{D}$ to obtain the two transversals $$\bar{p}_i = \bar{p}a + \alpha_i\hat{a} + t\hat{t}_i \quad (13)$$

Figure 21:
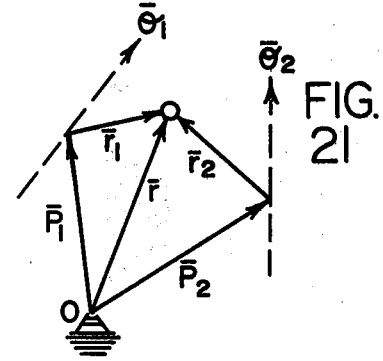
FIG. 21 is another mathematical diagram relating to accompanying analysis in the specification.

Appendix 3: Small Rotations of a Rigid Body (See FIG. 21)

Given several differentially small rotations $\bar{\theta}_i$ about axes $\bar{p}_i$, the equivalent single rotation is $$\bar{\theta} = \Sigma\bar{\theta}_i \quad (1)$$

about axis p such that $$\bar{\theta} \times \bar{p} = \sigma\bar{\theta}_i \times \bar{p}_i \quad (2)$$

From (2):

$$(\bar{\theta} \times \bar{p}) \times \bar{\theta} = (\Sigma\bar{\theta}_i \times \bar{p}_i) \times \bar{\theta}$$

$$\theta^2\bar{p} - \lambda\bar{\theta} = (\Sigma\bar{\theta}_i \times \bar{p}_i) \times \bar{\theta}; (-\infty < \lambda < \infty)$$

$$\therefore \bar{p} = \frac{(\Sigma\bar{\theta}_i \times \bar{p}_i) \times \theta + \lambda\bar{\theta}}{\theta \cdot \theta} \quad (3)$$

The shortest vector between two axes $\bar{p}_1$ and $\bar{p}_2$ in directions $\hat{\theta}_1$ and $\hat{\theta}_2$ is perpendicular to both axes and can therefore be written in the form $l\hat{\theta}_1 \times \hat{\theta}_2$.

A small rotation $\bar{\theta} = \bar{\theta}_1 + \bar{\theta}_2$ about the combined axis $\bar{p}$ is in the direction $\bar{\theta}$ that is also perpendicular to the short connecting vector $l\hat{\theta}_1 \times \hat{\theta}_2$ and intersects the line of that vector at a place $$\frac{\bar{\theta}_2 \cdot \bar{\theta}}{\bar{\theta} \cdot \bar{\theta}} l\hat{\theta}_1 \times \hat{\theta}_2$$

from where it intersects the $\hat{\theta}_1$ axis.

Figure 22:
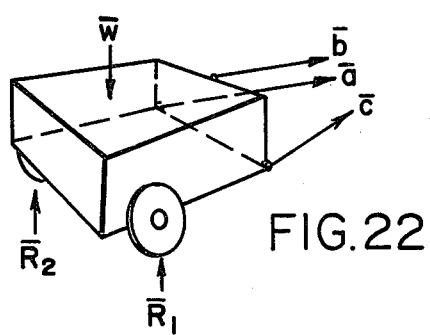
FIG. 22 is a diagrammatic perspective view of a two-wheel semi-trailer illustrating the force and link reacting vectors in a three-link embodiment of the invention.
Figure 23:
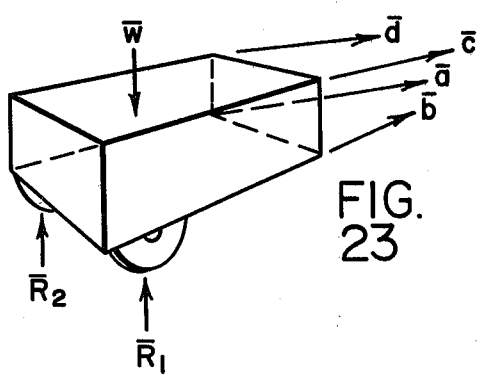
FIG. 23 is a similar perspective view of a two-wheel semi-trailer illustrating the force and link reaction vectors in a four-link embodiment of the invention.

Appendix 4: Link Forces (FIGS. 22 and 23)

Two Bar Systems $\bar{a}_1$ and $\bar{a}_2$ are links located from ball joints at position vectors $\bar{p}_1$ and $\bar{p}_2$ Let $\bar{F}$ be the sum of forces on the trailer dolly Let $\bar{M}$ be the sum of moments on the trailer dolly Then to replace the trailer forces by link forces, define scalars $\bar{\alpha}_i$ so that $\bar{F}_i = \alpha_i a_i$ New System = Old System Forces: $\alpha_1\bar{a}_1 + \alpha_2\bar{a}_2 = \bar{F} \quad (1)$ Moments: $\bar{p}_1 \times \bar{F}_1 + \bar{p}_2 \times \bar{F}_2 = \bar{p} \times \bar{F} \quad (2)$ Let origin be such that $\bar{p}_1 = \bar{O}$ Then $$\bar{p}_2 \times \bar{F}_2 = \bar{p} \times \bar{F}$$

$$\bar{p}_2 \times \alpha_2\bar{a}_2 = \bar{p} \times \bar{F} \quad (3)$$

Dot by $a_1$ to get $$\alpha_2 = \frac{\bar{p} \times \bar{F} \cdot \bar{a}_1}{\bar{p}_2 \times \bar{a}_2 \cdot \bar{a}_1} \quad (4)$$

Then $\alpha$, is obtained from (1), from $$\alpha_1 a_1 = \bar{F} - \alpha_2\bar{a}_2 \quad (5)$$

Three Bar Systems

New System = Old System

Forces:

$$\bar{a} + \bar{b} + \bar{c} = \bar{R} \quad (8)$$

Moments:

$$\bar{P}a \times \bar{a} + \bar{P}b \times \bar{b} + \bar{P}c \times \hat{c} = \bar{p} \times \bar{R} + \bar{M}_o \quad (9)$$

Take origin so $\bar{P}c = \bar{O}$ then $$\bar{P}a \times \hat{a} + \bar{P}b \times \bar{b} = \bar{M} \quad (10)$$

Let $\bar{a} = \alpha a$ and $\hat{b} = \beta b$ so $$\alpha \bar{P}a \times \hat{a} + \beta \bar{P}b \times \hat{b} = \bar{M} \quad (11)$$

Dotting (11) by b yields $$\alpha = \frac{\bar{M} \cdot \hat{b}}{\bar{P}a \times \hat{a} \cdot \hat{b}} \quad (12)$$

Dotting (11) by a yields $$\beta = \frac{\bar{M} \cdot \hat{a}}{\bar{P}b \times \hat{b} \cdot \hat{a}} \quad (13)$$

With $\bar{a}$ and $\bar{b}$ known, $\bar{c}$ is found by subtraction from (8).

Four Bar Systems $$\bar{R} = \Sigma \text{forces} = \bar{W} + \bar{R} + \bar{R}_2 \quad (1)$$

$$\bar{M} = \bar{P} \times \bar{R} = \Sigma \text{moments}$$

$$\therefore \bar{M} = \bar{P}w \times \bar{W} + \bar{P}_1 \times \bar{R}_1 + \bar{P}_2 \times \bar{R}_2 \quad (2)$$

New System = Old System

Forces:

$$\bar{a} + \bar{b} + \bar{c} + \bar{d} = \bar{R} \quad (3)$$

Moments:

$$\bar{P}a \times \bar{a} + \bar{P}b \times \bar{b} + \bar{P}c \times \bar{c} + \bar{P}d \times \bar{d} = \bar{P} \times \bar{R} \quad (4)$$

Take origin so $\bar{P}d = \bar{O}$
Then $$\bar{P}a \times \bar{a} + \bar{P}b \times \bar{b} + \bar{P}c \times \bar{c} = \bar{M} \quad (5)$$

Let $a = \alpha a, b = \beta b$ and $c = \gamma c$
Then, from (4)

$$\alpha \bar{P}a \times \hat{a} + \beta \bar{P}b \times \hat{b} + \gamma \bar{P}c \times \hat{c} = \bar{M} \quad (6)$$

Dot by $(\bar{P}b \times \hat{b}) \times (\bar{P}c \times \hat{c})$ to get $$\alpha = \frac{\bar{M} \cdot (\bar{P}b \times \hat{b}) \times (\bar{P}c \times \hat{c})}{\bar{P}a \times \hat{a} \cdot (\bar{P}b \times \hat{b}) \times (\bar{P}c \times \hat{c})} \quad (7)$$

$\beta$ and $\gamma$ are obtained similarly, then, with $\bar{a}$, $\bar{b}$ and $\bar{c}$ known, $\bar{d}$ is obtained by substitution from (3).

The preferred embodiment described herein is intended to be purely illustrative, and not limiting of the scope of the invention. Other embodiments and variations will be apparent to those skilled in the art and may be made without departing from the essence and scope of the invention as defined in the following claims.

I claim:

1. A towing connection for connecting a trailer having a pair of wheels toward its rear end only, to a towing vehicle, including in combination:
    three linear links, including one upper link and two lower links, the lower links being generally horizontal;
    a first corresponding series of spaced-apart ball joints connecting the links to a forward portion of the trailer; and
    a second corresponding series of spaced-apart ball joints connecting the links to a rearward portion of the towing vehicle, said second series of joints being closer together than the first series so that the links converge such that extended lines upon which the links lie approximately intersect a remote forward generally vertical instantaneous turning axis, and approximately intersect a remote forward generally horizontal carrying axis; and
    wherein the ball joint connecting the upper link to the towing vehicle is positioned somewhat aft of a transverse vertical plane passing substantially through the ball joints connecting the lower links to the towing vehicle, such that the trailer front is at the same level when the trailer is in a preselected turning angle in either direction with respect to the towing vehicle as it is when in the normal straight ahead towing position, whereby rise and fall of the trailer front during turning is substantially minimized.

2. The towing connection of claim 1, wherein the preselected turning angle is about 30°.

3. A towing connection for connecting a trailer having a pair of wheels toward its rear end only, to a towing vehicle, including in combination:
    at least three linear links, including at least one upper and at least two lower links;
    a first corresponding series of spaced-apart ball joints connecting the links to a forward portion of the trailer; and
    a second corresponding series of spaced-apart ball joints connecting the links to a rearward portion of the towing vehicle, said second series of joints being closer together than the first series so that the links converge such that extended lines upon which the links lie approximately intersect a remote forward generally vertical instantaneous turning axis, and approximately intersect a remote forward generally horizontal carrying axis;
    said ball joints being so arranged as to substantially minimize rise and fall during turning; and
    the upper links being rigid, non-compressible members, and the lower links being tension-only members which yield in a compression situation, the two lower links being in, tension in a normal straight ahead towing configuration.

4. The towing connection of claim 3, the upper link being obliquely angled with respect to horizontal no more than about 31° in the normal straight ahead towing position.

5. The towing connection of claim 3, each upper link being oriented with respect to horizontal at an angle of about 26° to about 31°.

6. A linkage system for connecting a trailer to a towing road vehicle, comprising:
    four links extending between the trailer and the towing vehicle, including two upper links, generally symmetrically arranged, and two lower links, generally symmetrically arranged and oriented generally in a horizontal plane;
    ball joint type connections at the ends of the links and positioned such that the links converge from the trailer toward the towing vehicle, with link lines of each of two pairs of the links approximately intersecting at remote forward points in the towing vehicles and with two theoretical planes, each containing one of said pairs of the links, intersecting in a remote forward line; and wherein each link and its ball joint type connections are so positioned and oriented that the line upon which the link lies intersects the theoretical hyperboloid family of instantaneous axes defined by the other three link lines; and the lower links being tension-only members which slacken in a compression situation, and the upper links being rigid in compression and oriented at about 26° to about 31° to the horizontal, the two lower links being in tension in a normal, straight ahead towing configuration.

7. The linkage system of claim 6, further including additional tension-only members between the two lower links and also converging from the trailer toward the towing vehicle, for redundancy.

8. The linkage system of claim 6, wherein the four ball joint type connections at the towing vehicle lie generally in a common vertical plane and in a generally rectangular array, and wherein the four ball joint type connections at the trailer lie generally in another common vertical plane and in a generally rectangular array.

9. A system for carrying a load between the rear of a leading vehicle and the front of a trailing vehicle, comprising:

at least three front support links connected to the rear of the leading vehicle and to the front of the load by spaced apart ball joint type connections, the links lying on link lines converging toward the leading vehicle to define at least a remote forward carrying axis; and at least three rear support links connected to the front of the trailing vehicle and to the rear of the load by spaced apart ball joint type connections, the rear support links lying on link lines converging toward the trailing vehicle to define at least a remote rearward carrying axis;

the support links including upper links and lower links, the upper links being in compression and the lower links being in tension.

10. The load-carrying system of claim 9, further including load raising and lowering means associated with the front support links and the rear support links.

11. The load-carrying system of claim 10, wherein the load raising and lowering means comprises means for changing the lengths of at least some of the links.

12. The load-carrying system of claim 9, wherein the lower links comprise a pair of links at both the front and rear of the load, and wherein each set of lower links converges toward a remote steering center within the adjacent vehicle, with the upper link associated with each set of lower links lying in a plane which converges toward and intersects the plane of the lower links in a remote horizontal carrying axis within the adjacent vehicle.

13. A method of designing a three-link hitching system for connecting a trailer to a towing vehicle, comprising:

connecting two lower links by ball joint type connections to the rear of the towing vehicle and to the front of the trailer, such that the links lie generally in a common generally horizontal plane and on link lines that converge toward the towing vehicle and intersect generally at a remote forward steering axis when the two vehicles are in the straight aligned position;

finding a vertical axis within a vertical longitudinal plane bisecting the towing vehicle, whose distance from a preselected central vertical axis generally at the trailer's front, is substantially the same at 0° turning angle, i.e. the straight aligned position, as it is at a preselected turning angle of the two vehicles in either direction, said vertical axis within said vertical longitudinal plane being somewhat aft of the two lower link connections at the rear of the towing vehicle;

connecting an upper link to the towing vehicle and the trailer, with ball joint type connections at both ends of the link, one such connection being on said preselected central vertical axis above the two lower links, and the other such connection being lower, on said vertical axis within said vertical longitudinal plane such that the line of the upper link intersects said common generally horizontal plane of the lower links at a remote forward carrying center;

whereby the trailer front will be at the same level with respect to the towing vehicle at 0° and at the preselected turning angle in either direction, and rise and fall of the trailer front between 0° and the preselected turning angle will be insubstantial.

14. The method of claim 13, wherein the preselected turning angle is 30°.

15. The method of claim 13, wherein the lines of the three links converge generally toward a single forward point in the straight aligned towing position of the two vehicles.

16. A towing connection for connecting a trailer having a pair of wheels toward its rear end only, to a towing vehicle, including in combination:

four linear links, including upper and lower links;

a first corresponding series of spaced-apart ball joints connecting the links to a forward portion of the trailer; and a second corresponding series of spaced-apart ball joints connecting the links to a rearward portion of the towing vehicle, said second series of joints being closer together than the first series so that the links converge such that extended lines upon which the links lie approximately intersect a remote forward generally vertical instantaneous turning axis, and approximately intersect a remote forward generally horizontal carrying axis;

the lower links being rigid in tension and the upper links being extensible compression-only members, for extending in a tension situation, whereby the towing connection can accommodate relative twist between the trailer and the towing vehicle without locking up.

* * * * *